(12) United States Patent
Kuwazoe

(10) Patent No.: US 10,542,227 B2
(45) Date of Patent: *Jan. 21, 2020

(54) IMAGE SENSOR, CONTROL METHOD OF IMAGE SENSOR, AND IMAGING APPARATUS

(71) Applicant: Sony Corporation, Tokyo (JP)

(72) Inventor: Yasuyoshi Kuwazoe, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/992,867

(22) Filed: May 30, 2018

(65) Prior Publication Data

US 2018/0278872 A1 Sep. 27, 2018

Related U.S. Application Data

(63) Continuation of application No. 13/859,123, filed on Apr. 9, 2013, now Pat. No. 10,009,563.

(30) Foreign Application Priority Data

Apr. 16, 2012 (JP) ................................ 2012-092590

(51) Int. Cl.
 *H04N 5/345* (2011.01)
 *H04N 5/374* (2011.01)
 (Continued)

(52) U.S. Cl.
 CPC ..... *H04N 5/3456* (2013.01); *H04N 5/232122* (2018.08); *H04N 5/3696* (2013.01);
 (Continued)

(58) Field of Classification Search
 CPC .... H04N 5/23212; H04N 5/341; H04N 5/345; H04N 5/3456; H04N 5/369;
 (Continued)

(56) References Cited

U.S. PATENT DOCUMENTS

| 2009/0122171 A1 | 5/2009 | Suzuki |
| 2009/0135289 A1 | 5/2009 | Kusaka |

(Continued)

FOREIGN PATENT DOCUMENTS

| CN | 102197328 A | 9/2011 |
| EP | 2249192 A1 | 11/2010 |

(Continued)

OTHER PUBLICATIONS

Japanese Office Action for JP Application No. 2012092590, dated Feb. 9, 2016.

(Continued)

*Primary Examiner* — Daniel M Pasiewicz
(74) *Attorney, Agent, or Firm* — Lerner, David, Littenberg, Krumholz & Mentlik, LLP

(57) ABSTRACT

There is provided an image sensor, including a plurality of phase difference lines in which a plurality of pixels including phase difference pixels for detecting a phase difference are arranged, a plurality of normal lines in which a plurality of normal pixels not including the phase difference pixels are arranged, a row scanning section which selects each of the plurality of phase difference lines and each of the plurality of normal lines within a first period, and selects each of the plurality of phase difference lines within a second period different from the first period, and a column scanning section which outputs pixel values of the plurality of normal pixels in each of the lines selected within the first period, and outputs pixel values of the phase difference pixels in each of the lines selected within the second period.

19 Claims, 22 Drawing Sheets

(51) Int. Cl.
  *H04N 5/376* (2011.01)
  *H04N 5/369* (2011.01)
  *H04N 5/232* (2006.01)
  *G03B 13/36* (2006.01)
(52) U.S. Cl.
  CPC ....... *H04N 5/36961* (2018.08); *H04N 5/3742* (2013.01); *H04N 5/3765* (2013.01); *G03B 13/36* (2013.01); *H04N 5/23212* (2013.01)
(58) Field of Classification Search
  CPC .... H04N 5/3696; H04N 5/374; H04N 5/3742; H04N 5/376; H04N 5/3765
  See application file for complete search history.

(56) References Cited

U.S. PATENT DOCUMENTS

| | | |
|---|---|---|
| 2009/0140122 A1 | 6/2009 | Suzuki |
| 2009/0160969 A1 | 6/2009 | Kuroiwa |
| 2009/0213255 A1 | 8/2009 | Suzuki |
| 2011/0273581 A1 | 11/2011 | Fujii et al. |
| 2011/0285899 A1 | 11/2011 | Hirose |
| 2012/0307130 A1 | 12/2012 | Usui |
| 2014/0340565 A1 | 11/2014 | Kitani et al. |

FOREIGN PATENT DOCUMENTS

| | | |
|---|---|---|
| JP | 2009089143 A | 4/2009 |
| JP | 2010074243 A | 4/2010 |
| JP | 2011101325 A | 5/2011 |
| JP | 2012015819 A | 1/2012 |
| WO | 2012023355 A1 | 2/2012 |

OTHER PUBLICATIONS

Chinese Office Action for Application No. 201310130920.0 dated Nov. 2, 2016.

FIG. 3

| CONTROL SIGNAL | OPERATION OF TIMING CONTROL CIRCUIT | OPERATION OF ROW SCANNING CIRCUIT | OPERATION OF COLUMN SCANNING CIRCUIT |
|---|---|---|---|
| 0 (LIVE VIEW) | OUTPUT TIMING SIGNAL Tc EVERY 1/30 SECONDS | SELECT 1/3 OF LINES IN ACCORDANCE WITH TIMING SIGNAL Tc, THEN SELECT PHASE DIFFERENCE LINES | SELECT NORMAL PIXELS AT TIME OF SELECTING 1/3 OF LINES, AND SELECT PHASE DIFFERENCE PIXELS AT TIME OF SELECTING PHASE DIFFERENCE LINES |
| 1 (CAPTURE) | OUTPUT TIMING SIGNAL Tc IN ACCORDANCE WITH SHUTTER SPEED OR EVERY 1/30 SECONDS | SELECT ALL LINES IN ACCORDANCE WITH TIMING SIGNAL Tc, THEN SELECT PHASE DIFFERENCE LINES | SELECT NORMAL PIXELS AT TIME OF SELECTING ALL LINES, AND SELECT PHASE DIFFERENCE PIXELS AT TIME OF SELECTING PHASE DIFFERENCE LINES |

IMAGE SENSOR, CONTROL METHOD OF IMAGE SENSOR, AND IMAGING APPARATUS

CROSS-REFERENCE TO RELATED APPLICATION

The present application is a continuation of U.S. patent application Ser. No. 13/859,123 filed on Apr. 9, 2013 which claims priority from Japanese Patent Application No. JP 2012-092590 filed in the Japanese Patent Office on Apr. 16, 2012, the entire content of which is incorporated herein by reference.

BACKGROUND

The present disclosure relates to an image sensor, a control method of the image sensor, and an imaging apparatus. In more detail, the present disclosure relates to an image sensor which includes pixels for detecting a phase difference, a control method of the image sensor, and an imaging apparatus.

In related art, a phase difference detection system is known as one technique for focus detection in an imaging apparatus. This phase difference detection system is a system which detects a focal point from a phase difference of a signal output by a pair of light receiving elements. In an imaging apparatus which does not include a mirror guiding light to the light receiving elements for this phase difference detection, pixels for detecting the phase difference (hereinafter, called "phase difference pixels") may be arranged on a light receiving surface along with other pixels (hereinafter, called "normal pixels"). In the case where an image is captured and a phase difference is detected in such an imaging apparatus, an image process, such as a de-mosaic process, is usually performed by reading pixel values of all the pixels, and then interpolating pixel values of the phase difference pixels in these pixel values. Further, the detection of a phase difference is performed by separating the pixel values of the phase difference pixels from the pixel values of all the read out pixels.

In an imaging apparatus in which such phase difference pixels and normal pixels are arranged, the response of displaying and focusing the image improves as the time from the start of imaging until the end of the image process and phase difference detection process shortens. Accordingly, in order to shorten the time until the end of the image process and phase difference detection process, a control method has been proposed (for example, refer to JP 2011-101325A) which performs, for example, reading by thinning lines, such as reading only one out of three lines, when reading the pixel values.

SUMMARY

However, in the above described technology of the related art, there is a possibility that the time from the start of imaging until the end of the image process or phase difference detection process may not be able to be sufficiently shortened. In the case where the phase difference detection process and image process are performed by thinning lines, since it may be necessary for the imaging apparatus to read unnecessary phase difference pixels in the image process, the start of the image process may be delayed for the amount of time to read the unnecessary phase difference pixels. Further, since it may be necessary for the imaging apparatus to read unnecessary normal pixels in the phase difference detection, the start of the phase difference detection may be delayed for the amount of time to read the unnecessary normal pixels. Accordingly, there is the problem that the time from the start of imaging until the end of the image process or phase difference detection process may not be sufficiently shortened.

The present disclosure has been made in view of such a situation, and it is desirable in the imaging apparatus to shorten the time from the start of imaging until the end of the image process or phase difference detection process.

In light of the foregoing, according to a first embodiment of the present disclosure, there is provided an image sensor, including a plurality of phase difference lines in which a plurality of pixels including phase difference pixels for detecting a phase difference are arranged, a plurality of normal lines in which a plurality of normal pixels not including the phase difference pixels are arranged, a row scanning section which selects each of the plurality of phase difference lines and each of the plurality of normal lines within a first period, and selects each of the plurality of phase difference lines within a second period different from the first period, and a column scanning section which outputs pixel values of the plurality of normal pixels in each of the lines selected within the first period, and outputs pixel values of the phase difference pixels in each of the lines selected within the second period. In this way, an operation is brought about in which the pixel values of the plurality of normal pixels are output in each of the lines selected within the first period, and the pixel values of the phase difference pixels are output in each of the lines selected within the second period.

Further, according to the embodiment, the image sensor may include a driving section which concurrently drives each of the plurality of normal pixels in each of the lines selected within the first period, and concurrently drives each of the phase difference pixels in each of the lines selected within the second period, and a pixel value holding section which holds pixel values of the driven normal pixels or the driven phase difference pixels. The column scanning section may output each of the held pixel values in a predetermined order. In this way, an operation is brought about in which each of the plurality of normal pixels or phase difference pixels are concurrently driven in each of the selected lines, each of the pixel values of the driven phase difference pixels are held, and each of the held pixel values are output in a predetermined order.

Further, according to the embodiment, the column scanning section may further output fixed values, which are not output as pixel values of pixels, in an order corresponding to positions of the phase difference pixels, in a case where any of the plurality of phase difference lines are selected within the first period. In this way, an operation is brought about in which fixed values are further output in an order corresponding to the position of the phase difference pixels, in the case where any of the plurality of phase difference lines are selected within the first period.

Further, according to the embodiment, the image sensor may include a pixel addition section which adds pixel values of the normal pixels and the fixed values, in a case where the phase difference pixels are included in a plurality of pixels having a predetermined positional relation in each of the lines selected within the first period, and adds the pixel values of the plurality of pixels, in a case where the phase difference pixels are not included in the plurality of pixels having the predetermined positional relation. The column scanning section may output the added values in each of the lines selected within the first period. In this way, an operation is brought about in which the added values are output in each of the lines selected within the first period.

Further, according to the embodiment, each of the plurality of phase difference pixels may include a pair of phase difference pixels for receiving a pair of light beams subjected to pupil division. The row scanning section may execute a scanning process twice which selects each of the phase difference lines in the second period. The column scanning section may output a pixel value of one of the pair of phase difference pixels in lines selected in a first scanning process within the second period, and outputs a pixel value of the other of the pair of phase difference pixels in lines selected in a second scanning process within the second period. In this way, an operation is brought about in which one pixel value from the pair of phase difference pixels is output by the first scanning process, and the other pixel value is output by the second scanning process.

Further, according to a second embodiment of the present disclosure, there is provided an imaging apparatus, including an image sensor including a plurality of phase difference lines in which a plurality of pixels including phase difference pixels for detecting a phase difference are arranged, a plurality of normal lines in which a plurality of normal pixels not including the phase difference pixels are arranged, a row scanning section which selects each of the plurality of phase difference lines and each of the plurality of normal lines within a first period, and selects each of the plurality of phase difference lines within a second period different from the first period, and a column scanning section which outputs pixel values of the plurality of normal pixels in each of the lines selected within the first period, and outputs pixel values of the phase difference pixels in each of the lines selected within the second period, an image processing section which generates an image from the output pixel values of the plurality of normal pixels, and a phase difference detection section which detects a phase difference based on the output pixel values of the phase difference pixels.

According to the embodiments of the present disclosure described above, an excellent effect can be accomplished in the imaging apparatus in which the time from the start of imaging until the end of the image process or phase difference detection process is shortened.

BRIEF DESCRIPTION OF THE DRAWINGS

FIG. 3 is a figure which shows an example of the operations of the image sensor in the first embodiment;

DETAILED DESCRIPTION OF THE EMBODIMENT(S)

Figure 1:
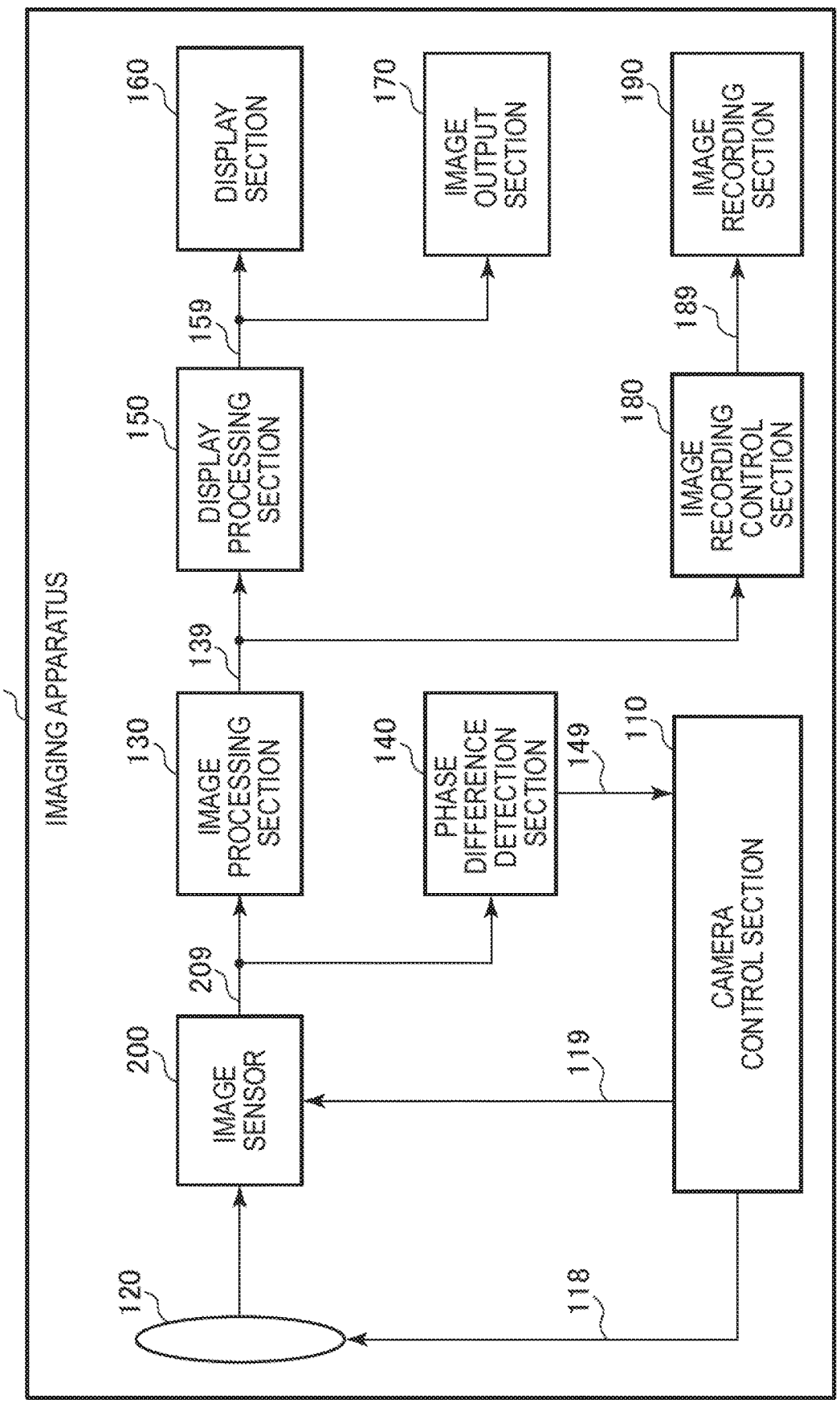
FIG. 1 is a block diagram which shows a configuration example of an imaging apparatus in a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the modes for carrying out the present disclosure (hereinafter, called the embodiments) will be described. The description will be made in the following order.

1. The first embodiment (Example of outputting pixel values of normal pixels, and outputting pixel values of phase difference pixels)

2. The second embodiment (Example of outputting pixel values of normal pixels and fixed values, and performing pixel addition)

3. The third embodiment (Example of outputting pixel values of left side pixels, and outputting pixel values of right side pixels)

1. The First Embodiment

[Configuration Example of the Imaging Apparatus]

FIG. 1 is a block diagram which shows a configuration example of an imaging apparatus 100 in the first embodiment of the present disclosure. This imaging apparatus 100 is an apparatus which captures images, and includes a camera control section 110, a photographic lens 120, an image processing section 130, a phase difference detection section 140, a display processing section 150, a display section 160, an image output section 170, an image recording control section 180, and an image recording section 190. Further, the imaging apparatus 100 additionally includes an image sensor 200.

The camera control section 110 controls the entire imaging apparatus 100. This camera control section 110 captures an image by outputting a control signal to the image sensor 200 via a signal line 119, in accordance with an operation of a user. For example, a signal which shows either a live view mode or a capture mode is included in the control signal. A live view mode is a mode for displaying an image on the display section 160 by capturing the image at regular intervals (for example, every 1/30 seconds). On the other hand, a capture mode is a mode for recording a moving image or a still image by capturing the moving image or still image. A plurality of images captured at regular intervals is included in the moving image. The image captured in a live view mode is set to a resolution lower than that of the image captured in a capture mode. Further, the camera control section 110 adjusts a focal length, by receiving a phase difference which the phase difference detection section 140 has detected, in accordance with an operation of the user, and by controlling the position of a focusing lens or the like in the photographic lens 120 according to the phase difference.

The photographic lens 120 is a lens which can change the focal length. For example, a focusing lens, a variator, a compensator, and a master lens, a so-called group of 4 zoom lenses, are used as the photographic lens 120.

The image sensor 200 converts an amount of light received via the photographic lens 120 into an electric potential, and outputs pixel values in accordance with this electric potential. This image sensor 200 includes a plurality of normal pixels and a plurality of phase difference pixels. These phase difference pixels are pixels for detecting a phase difference. Also, each of the phase difference pixels includes a pair of pixels for receiving both of a pair of light beams subjected to pupil division (hereinafter, called a "left side pixel" and a "right side pixel"). Further, the normal pixels are pixels other than the phase difference pixels, and are used for generating an image. The image sensor 200 reads the pixel values of the normal pixels, in accordance with the control of the camera control section 110, and outputs the pixel values to the image processing section 130 via a signal line 209. Further, the image sensor 200 reads the pixel values of the phase difference pixels, and outputs the pixel values to the phase difference detection section 140 via the signal line 209.

The image processing section 130 executes an image process, such as a de-mosaic process, for the image generated by the pixel values of the normal pixels. This image processing section 130 holds an image having the pixel values of the normal pixels, and interpolates the pixel values of the phase difference pixels in this image. Also, the image processing section 130 executes as necessary an image process, such as a de-mosaic process or a white balance process, in the image after interpolation, and outputs the image to the display processing section 150 and the image recording control section 180 via a signal line 139.

The phase difference detection section 140 detects a phase difference from the pixel values of the phase difference pixels. The phase difference detection section 140 generates, for example, a distribution of luminance values for each of the left side and right side pixels, and detects a phase difference from the degree of correlation between them. The phase difference detection section 140 outputs the detected phase difference to the camera control section 110 via a signal line 149.

The display processing section 150 executes as necessary a display process, such as a gamma correction process, a color correction process, or a contrast adjustment process, for the image. The display processing section 150 outputs the image after display processing to the display section 160 and the image output section 170 via a signal line 159.

The display section 160 displays the image from the display processing section 150. The image output section 170 outputs the image from the display processing section 150 to the outside of the imaging apparatus 100.

The image recording control section 180 outputs the image from the image processing section 130 to the image recording section 190 via a signal line 189, and causes the image recording section 190 to record this image. The image recording section 190 records the image.

[Configuration Example of the Image Sensor]

Figure 2:
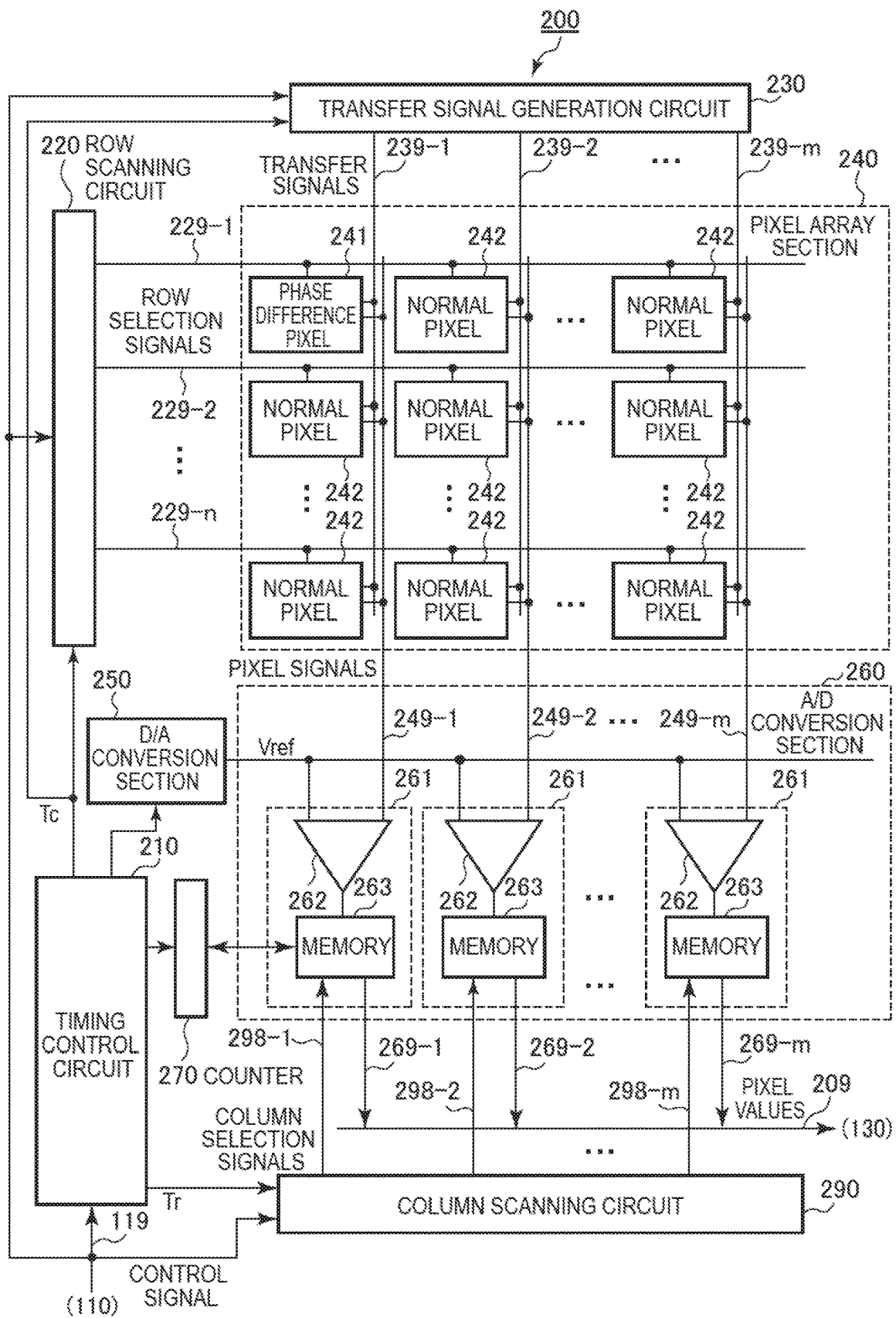
FIG. 2 is a block diagram which shows a configuration example of an image sensor in the first embodiment.

FIG. 2 is a block diagram which shows a configuration example of the image sensor 200 in the first embodiment. This image sensor 200 includes a timing control circuit 210, a row scanning circuit 220, a transfer signal generation circuit 230, a pixel array section 240, a D/A conversion section 250, an A/D conversion section 260, a counter 270, and a column scanning circuit 290.

The timing control circuit 210 controls the timing of the output of pixel values, in accordance with the control signal from the camera control section 110. This timing control circuit 210 controls the timing of the scanning of rows and columns by outputting timing signals Tc and Tr. The timing signal Tc is a signal which indicates the timing of the start of row scanning. On the other hand, the timing signal Tr is a signal which indicates the timing of the start of column scanning in each of the rows. Here, a row is a plurality of pixels arranged in one direction in the pixel array section 240, and is called a horizontal line. From among the rows (horizontal lines), the rows including phase difference pixels are called phase difference lines, and the rows not including phase difference pixels are called normal lines. On the other hand, a column is a plurality of pixels arranged in a direction perpendicular to the rows in the pixel array section 240, and is called a vertical line.

Specifically, the timing control circuit 210 generates a timing signal Tc at the start of an imaging period for capturing one image, and supplies the timing signal Tc to the row scanning circuit 220 and the transfer signal generation circuit 230. This imaging period is divided into a normal pixel output period for outputting the pixel values of the normal pixels, and a phase difference pixel output period for outputting the pixel values of the phase difference pixels. The timing control circuit 210 outputs the timing signal Tc at the start of the imaging period, and thereafter outputs the timing signal Tc at the start of the phase difference pixel output period. Then, the timing control circuit 210 generates the timing signal Tr synchronized with the timing of the selection of rows within the imaging period, and supplies the timing signal Tr to the column scanning circuit 290. However, since the number of selected rows is reduced in the case of a live view mode, the timing control circuit 210 generates a number of timing signals Tr within the imaging period less than that of the case of a capture mode.

For example, in the case where an image of n rows, which includes k rows of phase difference lines, and m columns is captured, the timing control circuit 210 generates the timing signal Tc once at the start of the imaging period, and generates the timing signal Tr n times within the normal pixel output period. Here, n and m are integers of 2 or more, and k is an integer from 1 to n. Then, the timing control circuit 210 generates the timing signal Tc once at the start of the phase difference pixel output period, and generates the timing signal Tr k times within the phase difference pixel output period.

Further, the timing control circuit 210 supplies a digital signal which shows a standard voltage value to the D/A conversion section 250. In addition, the timing control circuit 210 controls a counter 270 synchronized with the timing which generates the timing signal Tr, and sets a counter value to an initial value.

The row scanning circuit 220 selects each of the rows, in accordance with the timing signal Tc and the control signal. This row scanning circuit 220 selects rows by sequentially outputting row selection signals to each of the rows via signal lines 229-1 to 229-$n$, within the normal pixel output period. These row selection signals are set, for example, to a high level in the case where the row is selected, and are set to a low level in the case where the row is not selected. Further, the row scanning circuit 220 sequentially selects each of the phase difference lines, within the phase difference pixel output period. However, in the case of a live view mode, the row scanning circuit 220 selects a number of rows within the imaging period less than that of the case of a capture mode. Note that the row scanning circuit 220 is an example of a row scanning section described in the present disclosure.

The transfer signal generation circuit 230 drives the pixels by outputting a transfer signal to each of the pixels in the selected columns, in accordance with the timing signal Tc and the control signal. This transfer signal is set, for example, to a high level in the case where the pixel is driven, and is set to a low level in the case where the pixel is not driven. The transfer signal generation circuit 230 acquires a timing, at which the row scanning circuit 220 selects the rows, from the timing signal Tc. The transfer signal generation circuit 230 concurrently drives each of the normal pixels in the selected rows, synchronized with the timing of the selection of the rows, within the normal pixel output period. Then, the transfer signal generation circuit 230 concurrently drives each of the phase difference pixels in the selected rows, synchronized with the timing of the selection of the rows, within the phase difference pixel output period. However, in the case of a live view mode, since the number of rows selected is less than that of the case of a capture mode, the normal pixel output period and the phase difference pixel output period will be shortened. Note that the transfer signal generation circuit 230 is an example of a driving section described in the present disclosure.

The pixel array section 240 arranges the plurality of phase difference pixels 241 and the plurality of normal pixels 242 in a 2-dimensional grid manner. In the case where a high level row selection signal and transfer signal are input, each of the pixels outputs a pixel signal, which is an electric signal of the electric potential corresponding to an amount of received light, to the A/D conversion section 260 via a signal line of a corresponding column from among the signal lines 249-1 to 249-$m$.

The D/A conversion section 250 D/A (Digital to Analog) converts a standard voltage value from the timing control circuit 210, and supplies a standard voltage Vref to the A/D conversion section 260.

The A/D conversion section 260 converts pixel signals, which are analogue signals, into digital signals. The A/D conversion section 260 includes a plurality of (for example, m number of) A/D conversion circuits 261. Each A/D conversion circuit 261 includes a comparator 262 and a memory 263. The comparator 262 compares the standard voltage Vref and the voltage of the pixel signal, and outputs a comparison result. The A/D conversion circuits 261 integrate, for example, the pixel signals by an integration circuit, and measure in the counter 270 a period until the output values of the comparator 262 show an integrated voltage exceeding that of the standard voltage Vref. Then, the measured values of the counter 270 are held in the memories 263 as pixel values. Note that the integration circuit has been omitted from FIG. 2.

The memories 263 hold the pixel values. A column selection signal is input to each memory 263 via a signal wire of a corresponding column from among the signal wires 298-1 to 298-$m$. The column selection signal is a signal for outputting pixel values by selecting the memory 263 corresponding to a column. For example, a high level is set for the column selection signal in the case where pixel values are output, and a low level is set in the case where pixel values are not output. The memory 263 outputs pixel values via a signal line 209 in the case were the column selection signal is a high level.

The column scanning circuit 290 reads and outputs the pixel values of each of the pixels in the selected rows, in accordance with the timing signal Tr and the control signal. The transfer signal generation circuit 230 reads and outputs the pixel values of the normal pixels held in the A/D conversion section 260 in a predetermined sequence, each time the timing signal Tr is input, in the normal pixel output period. Further, the transfer signal generation circuit 230 reads and outputs the pixel values of the phase difference pixels held in the A/D conversion section 260 in a predetermined sequence, each time the timing signal Tr is input, in the phase difference pixel output period. Here, the column scanning circuit 290 acquires a start point and an end point for both the normal pixel output period and the phase difference pixel output period, by measuring the frequency of the timing signal Tr. For example, in the imaging of an image with n rows, the normal pixel output period is a period from the time when the timing signal Tr is first input until the time when the $n^{th}$ timing signal Tr is input. However, since there are less selected rows in a live view mode than that of the case of a capture mode, the row number of the timing signals measured in each period will also be less. Note that the column scanning circuit 290 is an example of a column scanning section described in the present disclosure.

FIG. 3 is a figure which shows an example of the operations of the image sensor 200 in the first embodiment. In the case where a live view mode is set by the control signal, the timing control circuit 210 generates, for example, the timing signal Tc every 1/30 seconds. In accordance with these timing signals Tc, the row scanning circuit 220 selects 1/3 of all the horizontal lines in the normal pixel output period. Next, the row scanning circuit 220 selects the phase difference lines in the phase difference pixel output period. The column scanning circuit 290 selects the normal pixels at the time of selecting 1/3 of the horizontal lines in the normal pixel output period. Next, the column scanning circuit 290 selects the phase difference pixels at the time of selecting the phase difference lines in the phase difference pixel output period.

On the other hand, in the case where a capture mode is set by the control signal, the timing control circuit 210 generates the timing signal Tc, in accordance with a shutter speed (during still image photography), or every 1/30 seconds or the like (during moving image photography). In accordance with these timing signals Tc, the row scanning circuit 220 selects all the horizontal lines in the normal pixel output period. Next, the row scanning circuit 220 selects the phase difference lines in the phase difference pixel output period. The column scanning circuit 290 selects the normal pixels at the time of selecting all the horizontal lines in the normal pixel output period. Next, the column scanning circuit 290 selects the phase difference pixels at the time of selecting the phase difference lines in the phase difference pixel output period. Note that the thinning number in a live view mode is not limited to 2 out of 3 lines. For example, in the case of a live view mode, the row scanning circuit 220 may have a configuration which selects not only ⅓ of the lines, but also ⅕ of the lines for all the rows.

Figure 4:
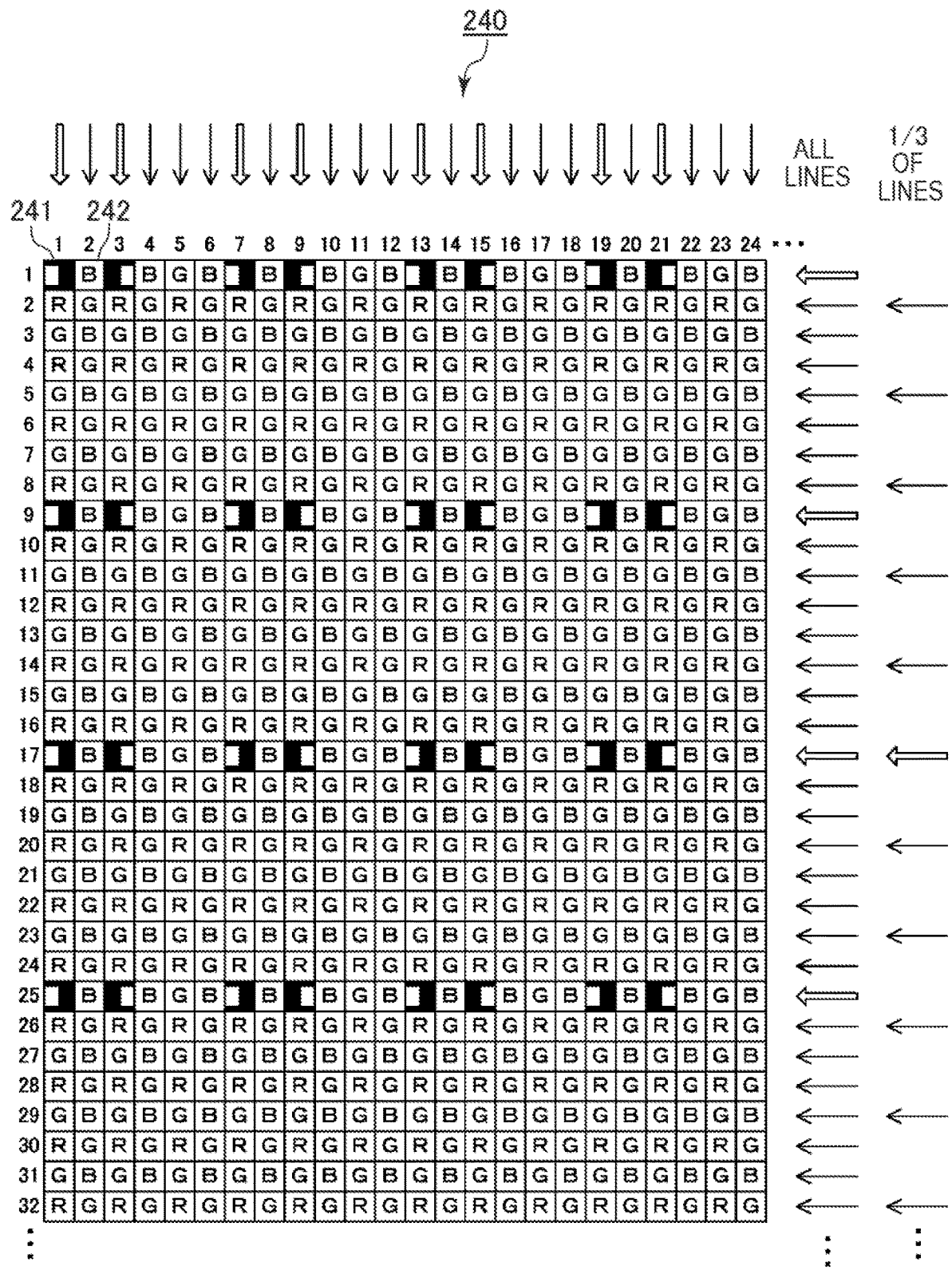
FIG. 4 is a figure which shows an example of an arrangement of pixels in the first embodiment.

FIG. 4 is a figure which shows an example of an arrangement of pixels in the first embodiment. A plurality of R (Red), G (green), or B (Blue) normal pixels 242 are arranged in a 2-dimensional grid manner, by an array system such as a Bayer arrangement, in the pixel array section 240. However, phase difference pixels 241 are arranged instead of the normal pixels in predetermined coordinates. For example, phase difference pixels are arranged in the first, third, seventh and ninth columns in the respective first, ninth and seventeenth rows.

In the case of a capture mode, all of the horizontal lines are selected in the normal pixel output period, and the normal pixels are output in these horizontal lines. Then, the phase difference lines (the first, ninth and seventeenth rows) are selected in the phase difference pixel output period, and the phase difference pixels are output in these horizontal lines.

On the other hand, in the case of a live view mode, ⅓ of all the horizontal lines are selected in the normal pixel output period, and the normal pixels are output in these horizontal lines. For example, the second, fifth and eighth rows are selected. Then, the phase difference lines (the seventeenth row) from among the ⅓ of the horizontal lines are selected in the phase difference pixel output period, and the phase difference pixels are output in these horizontal lines.

[Configuration Example of the Row Scanning Circuit]

Figure 5:
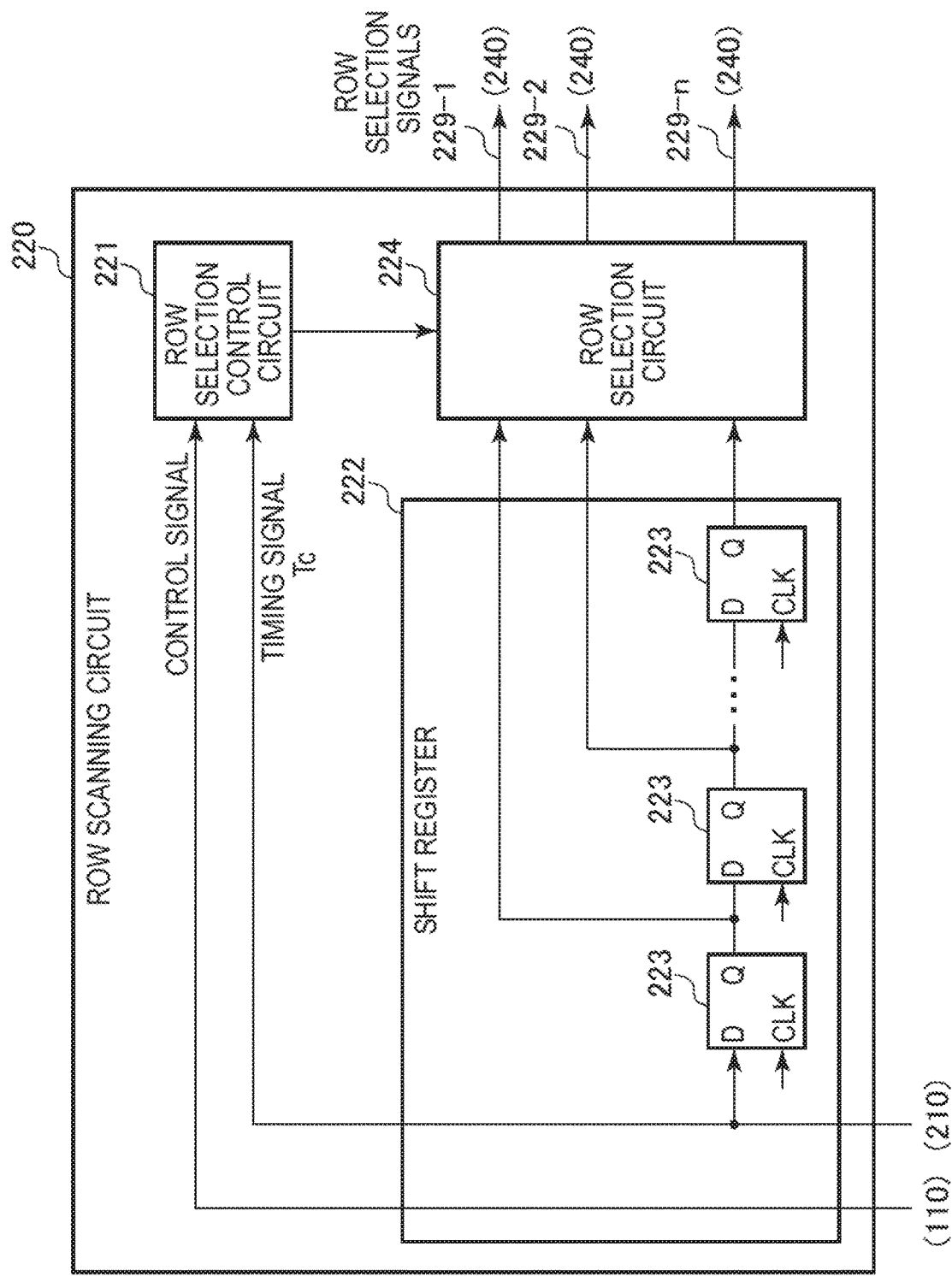
FIG. 5 is a block diagram which shows a configuration example of a row scanning circuit in the first embodiment.

FIG. 5 is a block diagram which shows a configuration example of the row scanning circuit 220 in the first embodiment. This row scanning circuit 220 includes a row selection control circuit 221, a shift register 222, and a row selection circuit 224.

The shift register 222 gradually delays and outputs the timing signal Tc. The shift register 222 includes plural stages (for example, n stages) of a D flip-flop 223 connected in series. The D flip-flop 223 delays and outputs the input signal. Specifically, when there is a clock signal of "1", the D flip-flop 223 outputs a signal with a value identical to that of the input signal. In this way, the input signal when there is a clock signal of "0" is delayed up until the clock signal rises. The timing signal Tc is input to the first stage of the D flip-flop 223. Each stage of the D flip-flop 223 delays the signal input from the previous stage, and outputs the signal to the next stage of the D flip-flop 223 and to the row selection circuit 224. Each output of the first to $n^{th}$ stages of the D flip-flop is used as a row selection signal of the first to $n^{th}$ rows. Since the row selection signal of each stage is delayed and output with respect to the row selection signal of the previous stage, each of the rows are sequentially selected from the beginning by these row selection signals.

The row selection control circuit 221 controls the row selection circuit 224, and selects the rows. The row selection control circuit 221 outputs all of the row selection signals from the shift register 222 to the rows corresponding to the respective row selection signals, within the normal pixel output period. Then, the row selection control circuit 221 outputs the row selection signals from the shift register 222 to the phase difference lines, within the phase difference pixel output period. For example, in the case where the first, ninth and seventeenth rows are phase difference lines, the row selection control circuit 221 outputs the row selection signal from the first stage of the D flip-flop 223 to the first row, outputs the row selection signal from the second stage to the ninth row, and outputs the row selection signal from the third stage to the seventeenth row. However, in the case of a live view mode, the row selection control circuit 221 selects a number of rows within the imaging period less than that of the case of a capture mode.

The row selection circuit 224 selects an output destination of the row selection signals from the shift register 222, in accordance with the control of the row selection control circuit 221.

[Configuration Example of the Transfer Signal Generation Circuit]

Figure 6:
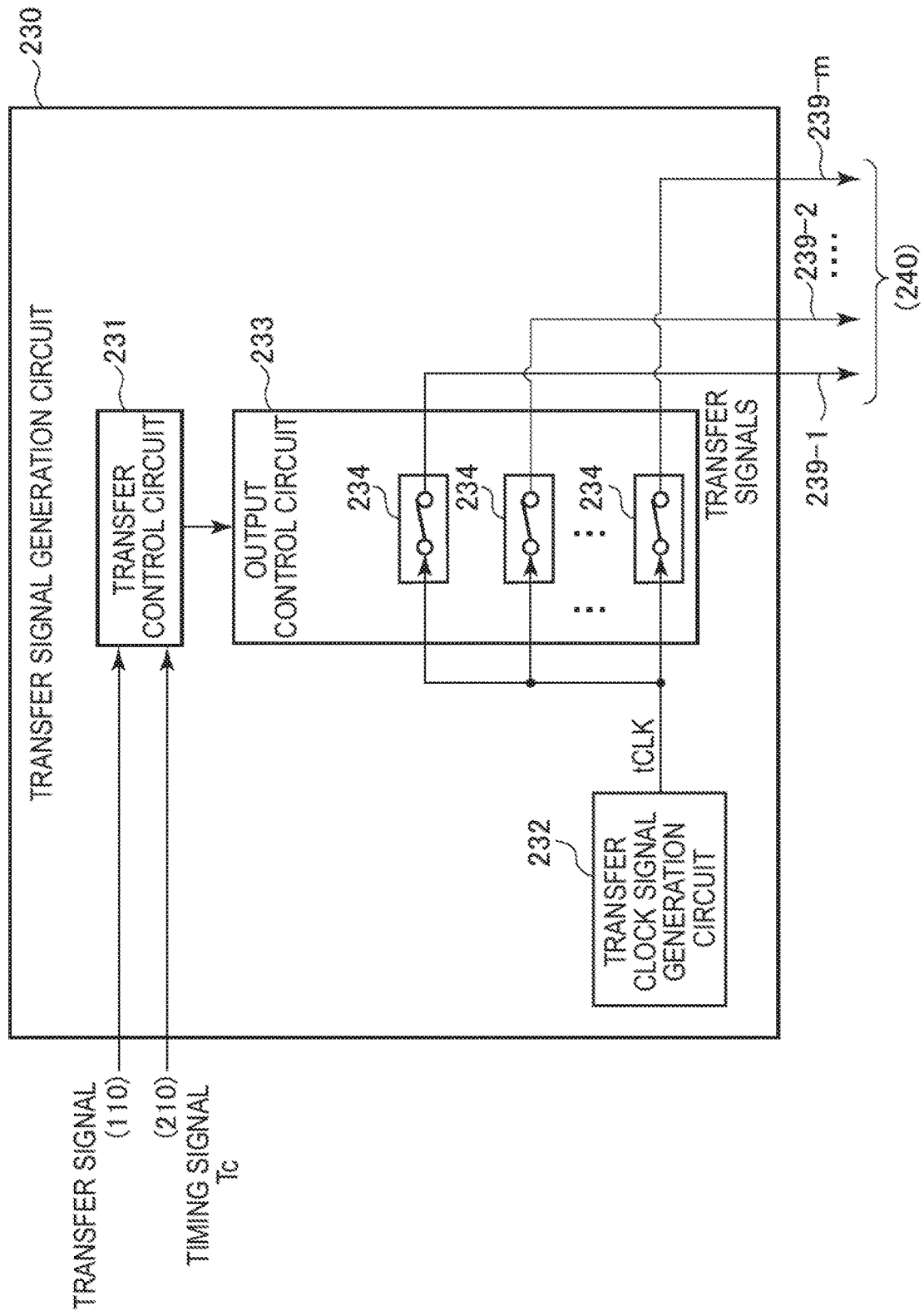
FIG. 6 is a block diagram which shows a configuration example of a transfer signal generation circuit in the first embodiment.

FIG. 6 is a block diagram which shows a configuration example of the transfer signal generation circuit 230 in the first embodiment. This transfer signal generation circuit 230 includes a transfer control circuit 231, a transfer clock signal generation circuit 232, and an output control circuit 233.

The transfer clock signal generation circuit 232 generates a transfer clock signal tCLK. The transfer clock signal tCLK is a clock signal which is adjusted so that the period becomes equal for the delay times of the signal per stage in the shift register 222. In this way, the transfer clock signal tCLK rises, synchronized with the timing of the selection of rows. The transfer clock signal tCLK is used as a transfer signal to each of the columns. The transfer clock signal generation circuit 232 outputs the generated transfer clock signal tCLK to the output control circuit 233.

The transfer control circuit 231 outputs the transfer signal to the output control circuit 233. The transfer control circuit 231 outputs the transfer signal to the columns in which the normal pixels are arranged, in the normal pixel output period. The transfer control circuit 231 outputs the transfer signal to all the columns at the time of selecting the normal lines, and outputs the transfer signal to the columns except for the columns of the phase difference pixels at the time of selecting the phase difference lines. For example, in the case where the phase difference pixels are arranged in the first and third rows of the phase difference lines, the transfer control circuit 231 outputs the transfer signal to the second and fourth rows, while excluding the first and third rows, at the time of selecting the phase difference lines.

On the other hand, the transfer control circuit 231 outputs the transfer signal to the columns in which the phase difference pixels are arranged, in the phase difference pixel output period. However, in the case of a live view mode, since the number of rows selected is less than that of the case of a capture mode, the output period of the transfer signal will be shortened.

The output control circuit 233 outputs the transfer signal to each of the columns, in accordance with the control of the transfer control circuit 231. The output control circuit 233 includes a plurality of (for example, m number of) switches 234. Each of the switches 234 is controlled in an on state and an off state by the transfer control circuit 231. An input signal is output in the case where the switch 234 is on, and the input signal is not output in the case where the switch 234 is off. The transfer clock signal tCLK is input to an input terminal of each of the m switches 234, and one of the signal lines 239-1 to 230-$m$ is connected to an output terminal of each of the m switches 234. For example, the transfer clock signal tCLK from the $r^{th}$ ($r$ is an integer from 1 to m) switch 234 is used as the transfer signal line to the $r^{th}$ column.

[Configuration Example of the Pixels]

Figure 7:
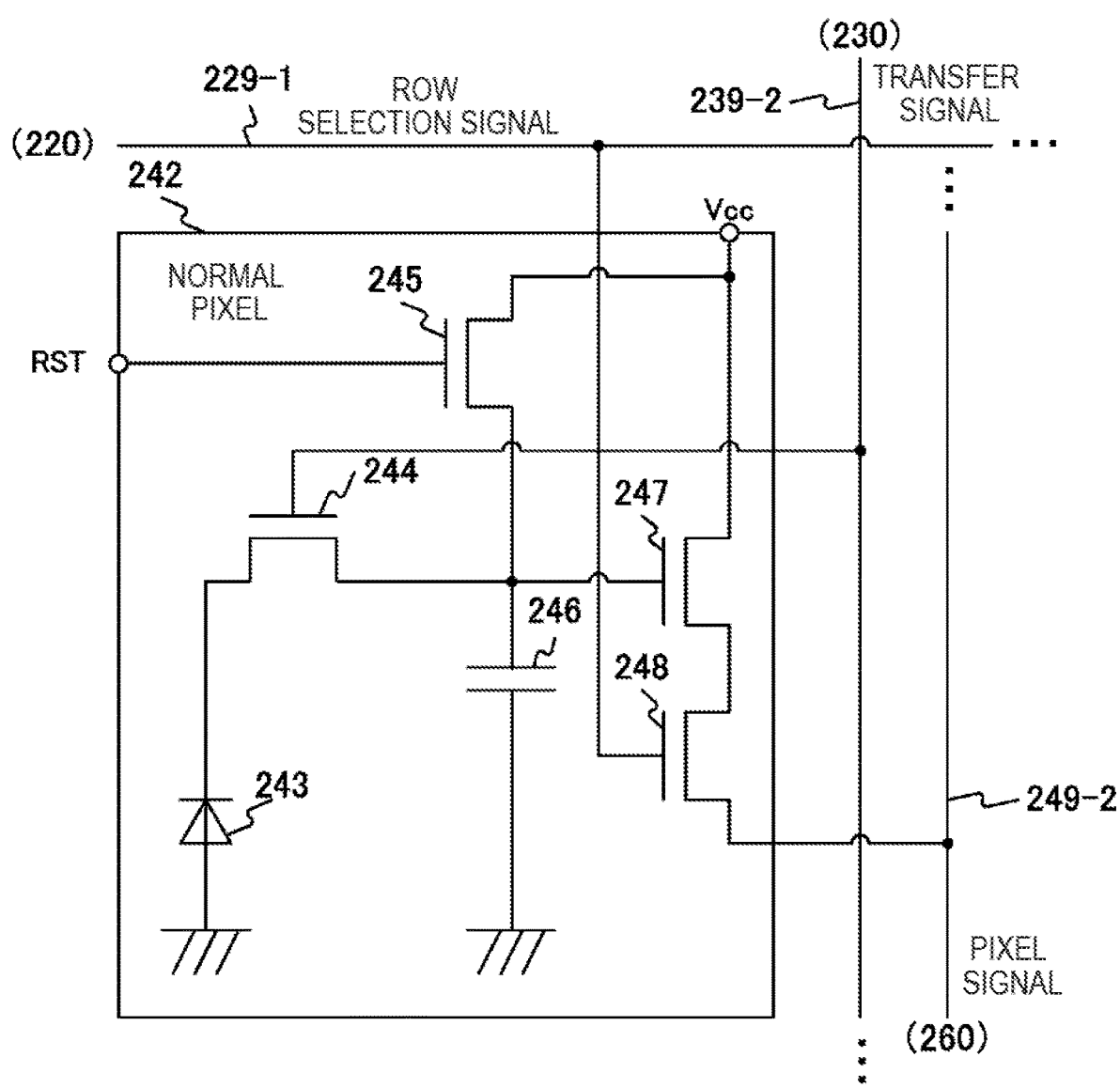
FIG. 7 is a circuit diagram which shows a configuration example of a normal pixel in the first embodiment.

FIG. 7 is a circuit diagram which shows a configuration example of a normal pixel 242. The normal pixel 242 includes a photodiode 243, a transfer transistor 244, a reset transistor 245, a floating diffusion layer 246, an amplification transistor 247, and a selection transistor 248. Note that the configuration of the phase difference pixels 241 is identical to the configuration of the normal pixels 242.

The photodiode 243 converts received light into an electric charge. The transfer transistor 244 is an element for transferring the electric charge converted by the photodiode 243 to the floating diffusion layer 246 in accordance with the transfer signal. An input terminal of this transfer transistor 244 is connected to an output terminal of the photodiode 243, and an output terminal is connected to the floating diffusion layer 246. Further, a control terminal of the transfer transistor 244 is connected to a signal line of a corresponding column from among the signal lines 239-1 to 239-$m$. For example, if the normal pixel 242 is a pixel which is positioned in the $r^{th}$ ($r$ is an integer from 1 to m) column, the control terminal of the transfer transistor 244 will be connected to the signal line 239-$r$. The transfer transistor 244 becomes an on state at the time when a high level transfer signal is input, and the electric charge converted by the photodiode 243 is transferred to the floating diffusion layer 246.

The reset transistor 245 is an element for setting the electric potential of the floating diffusion layer 246 to an initial electric potential in accordance with a reset signal. An input terminal of this reset transistor 245 is connected to a power supply terminal to which a power supply voltage Vcc is applied, and an output terminal is connected to the floating diffusion layer 246. Further, the reset signal is input to a control terminal of the reset transistor 245. This reset signal is a signal for controlling the electric potential of the floating diffusion layer 246 to the initial electric potential, and is generated, for example, prior to the imaging period by the row scanning circuit 220. In the case where the reset signal is input, the reset transistor 245 becomes an on state. As a result, the electric charge accumulated in the floating diffusion layer 246 is discharged, and the electric potential of the floating diffusion layer 246 becomes that of the initial electric potential.

The floating diffusion layer 246 accumulates the electric charge transferred by the transfer transistor 244. One terminal of this floating diffusion layer 246 is connected to an earth terminal, and the other terminal is connected to the output terminal of the transfer transistor 244, the output terminal of the reset transistor 245, and a gate terminal of the amplification transistor 247. In this way, the electric potential corresponding to the amount of charge accumulated in the floating diffusion layer 246 is applied to the gate terminal of the amplification transistor 247.

The amplification transistor 247 amplifies the applied electric potential. An input terminal of this amplification transistor 247 is connected to the power supply terminal, an output terminal is connected to an input terminal of the selection transistor 248, and a control terminal is connected to the floating diffusion layer 246. The amplification transistor 247 amplifies the electric potential of the floating diffusion layer 246 by a predetermined amplification rate, and outputs the amplified electric potential to the selection transistor 248.

The selection transistor 248 outputs an electric signal of the electric potential amplified by the amplification transistor 247, in accordance with the row selection signal. The input terminal of this selection transistor 248 is connected to the output terminal of the amplification transistor 247, and an output terminal is connected to a signal line of a corresponding column from among the signal lines 249-1 to 249-$m$. For example, if the normal pixel 242 is a pixel which is positioned in the $r^{th}$ column, the output terminal of the selection transistor 248 will be connected to the signal line 249-$r$. Further, a control terminal of the selection transistor 248 is connected to a signal line of a corresponding row from among the signal lines 229-1 to 229-$n$. For example, if the normal pixel 242 is a pixel which is positioned in the $c^{th}$ ($c$ is an integer from 1 to n) row, the control terminal of the selection transistor 248 will be connected to the signal line 229-$c$. In the case where a high level row selection signal is input, the selection transistor 248 becomes an on state. As a result, the electric signal of the electric potential corresponding to an amount of light is output from the normal pixel 242 to the A/D conversion section 260.

From the configuration exemplified in FIG. 7, the normal pixel 242 outputs an electric signal of the electric potential corresponding to an amount of light at the time when a high level row selection signal and a high level transfer signal are input.

[Configuration Example of the Column Scanning Circuit]

Figure 8:
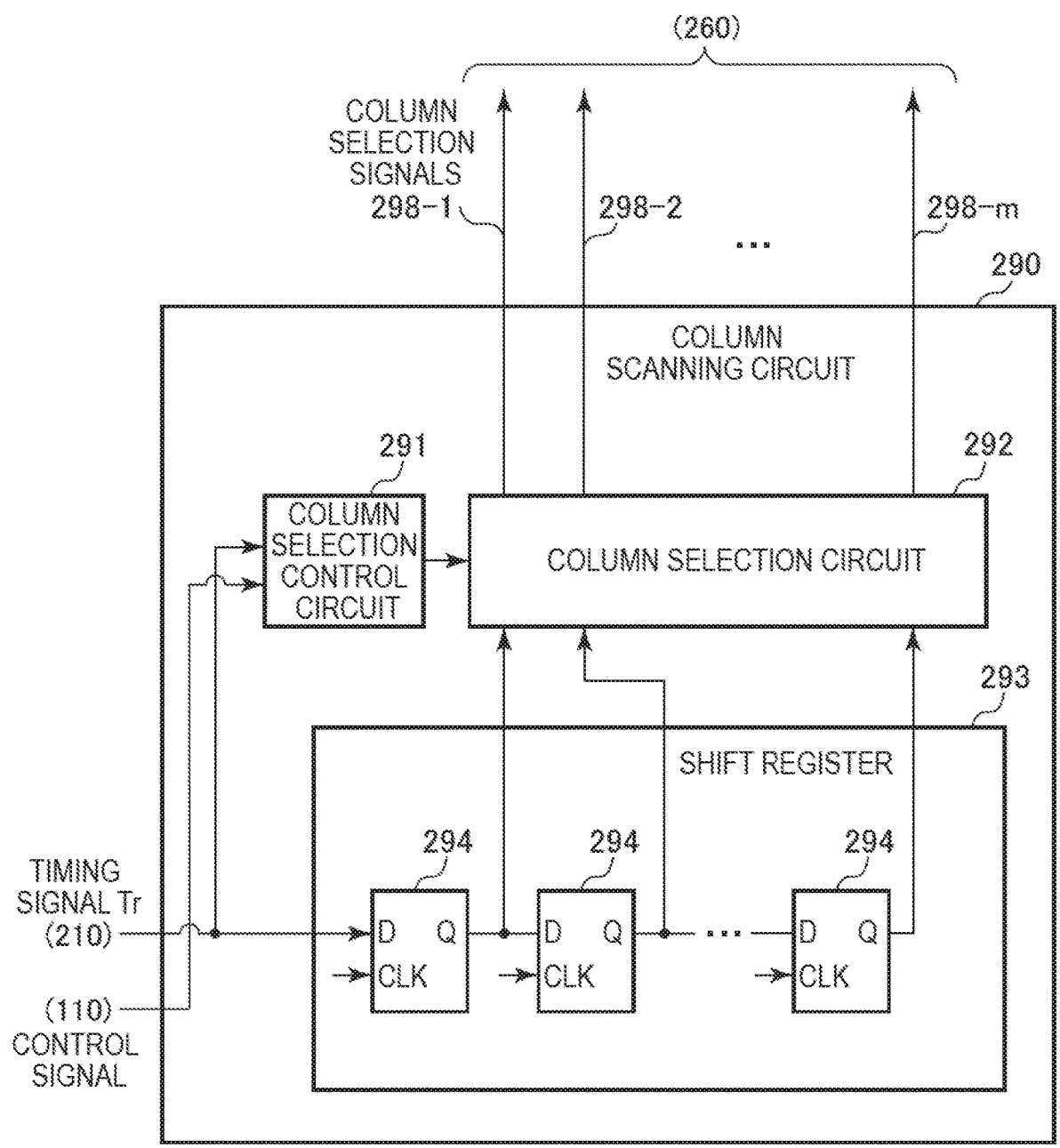
FIG. 8 is a block diagram which shows a configuration example of a column scanning circuit in the first embodiment.

FIG. 8 is a block diagram which shows a configuration example of the column scanning circuit 290 in the first embodiment. The column scanning circuit 290 includes a column selection control circuit 291, a column selection circuit 292, and a shift register 293.

The shift register 293 gradually delays and outputs the timing signal Tr. The shift register 293, similar to that of the shift register 222 for selecting rows, includes plural stages (for example, m stages) of a D flip-flop 294 connected in series. However, the delay time of all stages in the shift register 293 for selecting columns is set so as to be less than that of the first stage delay time in the shift register 222 for selecting rows.

The column selection control circuit 291 controls the column selection circuit 292, and selects the columns in a predetermined order. For example, the column selection control circuit 291 selects the first to $m^{th}$ columns in ascending order. The column selection control circuit 291 selects the columns in which the normal pixels are arranged, in the normal pixel output period. The column selection control circuit 291 selects all the columns at the time of selecting the normal lines, and selects the columns except for the columns of the phase difference pixels at the time of selecting the phase difference lines. For example, in the case where the phase difference pixels are arranged in the first and third columns of the phase difference lines, the column selection control circuit 291 sequentially selects the second and fourth columns, while excluding the first and third columns, at the time of selecting the phase difference lines.

On the other hand, the column selection control circuit 291 sequentially selects the columns in which the phase difference pixels are arranged, in the phase difference pixel output period. However, in the case of a live view mode, since the number of rows selected is less than that of the case of a capture mode, the normal pixel output period and the phase difference pixel output period will be shortened.

The column selection circuit 292 selects an output destination of the column selection signals from the shift register 293, in accordance with the control of the column selection control circuit 291. The column selection circuit 292 controls the A/D conversion section 260 by the column selection signals, and outputs the pixel values of the columns selected in the normal pixel output period to the image processing section 130. Further, the column selection circuit 292 outputs the pixel values of the columns selected in the phase difference pixel output period to the phase difference detection section 140.

[Configuration Example of the Image Processing Section]

Figure 9:
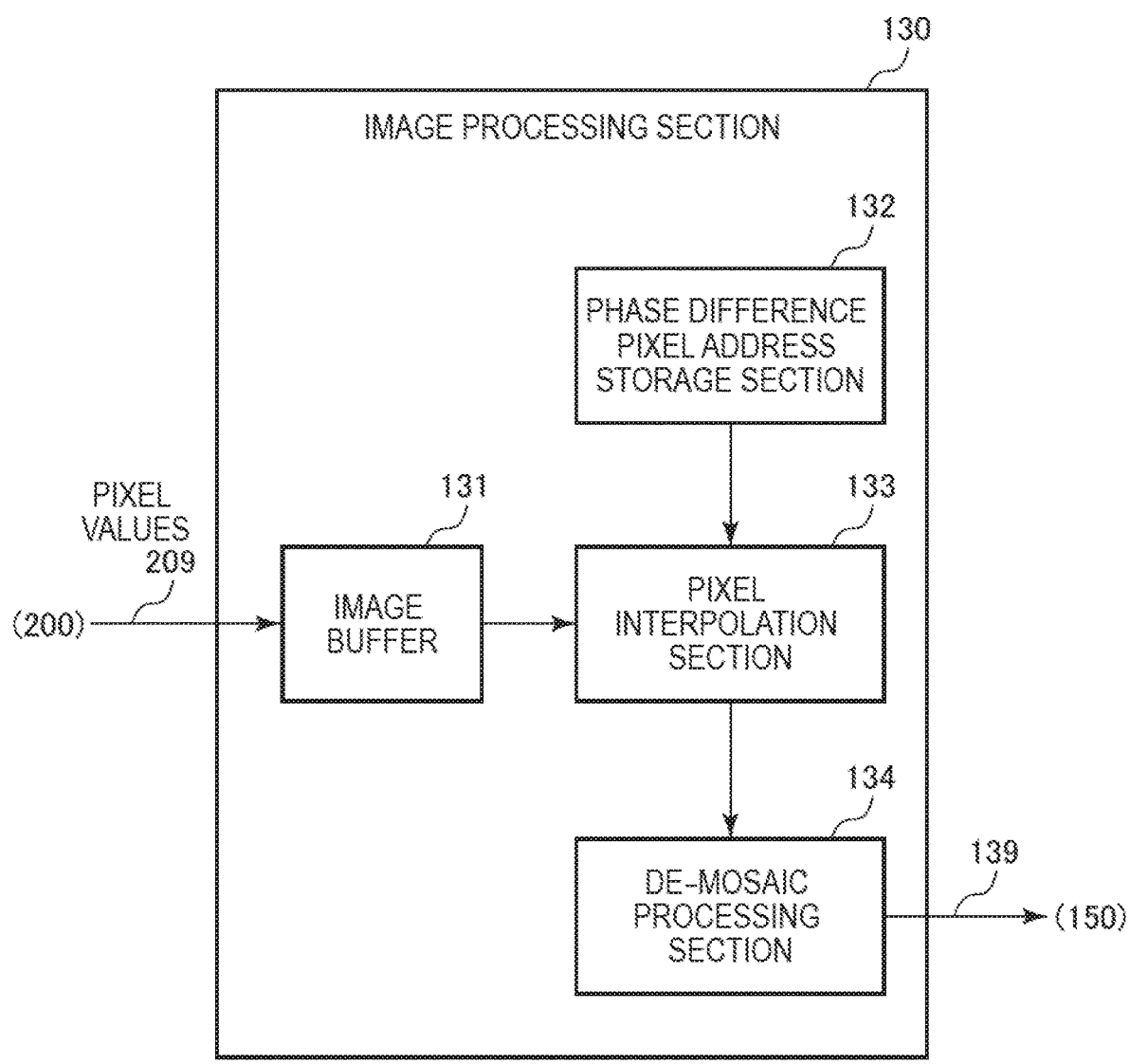
FIG. 9 is a block diagram which shows a configuration example of an image processing section in the first embodiment.

FIG. 9 is a block diagram which shows a configuration example of the image processing section 130. This image processing section 130 includes an image buffer 131, a phase difference pixel address storage section 132, a pixel interpolation section 133, and a de-mosaic processing section 134.

The image buffer 131 holds an image having the pixel values from the image sensor 200. The phase difference pixel address storage section 132 stores the addresses of the phase difference pixels in the image.

The pixel interpolation section 133 interpolates the pixel values of the phase difference pixels by using the pixel values of the normal pixels. This pixel interpolation section 133 reads the addresses of the phase difference pixels from the phase difference pixel address storage section 132, and reads the pixel values of the normal pixels near these addresses from the image buffer 131. Then, the pixel interpolation section 133 interpolates the pixel values of the phase difference pixels with the pixel values of the normal pixels. For example, in the case where the coordinates of a phase difference pixel is assumed to be (x, y), the pixel interpolation section 133 interpolates the pixel value of the phase difference pixel by an average value of pixel values for the 4 normal pixels (x−1, y−1), (x+1, y−1), (x−1, y+1), and (x+1, y+1). The pixel values of adjacent pixels are not used because the colors of adjacent pixels are different in a Bayer arrangement. The pixel interpolation section 133 outputs the image after interpolation to the de-mosaic processing section 134.

The de-mosaic processing section 134 executes a de-mosaic process which interpolates color information missing in each pixel, for the image after interpolation. The de-mosaic processing section 134 outputs the image after de-mosaic processing to the display processing section 150.

Note that while the image processing section 130 has a configuration which executes a de-mosaic process in an image (a so-called RAW image) prior to de-mosaic processing and thereafter outputs the image, it may output the RAW image as it is without performing the de-mosaic process. Further, the image processing section 130 may execute an image process other than that of a de-mosaic process, such as a white balance process or a color balance process.

[Operation Example of the Image Sensor]

Figure 10:
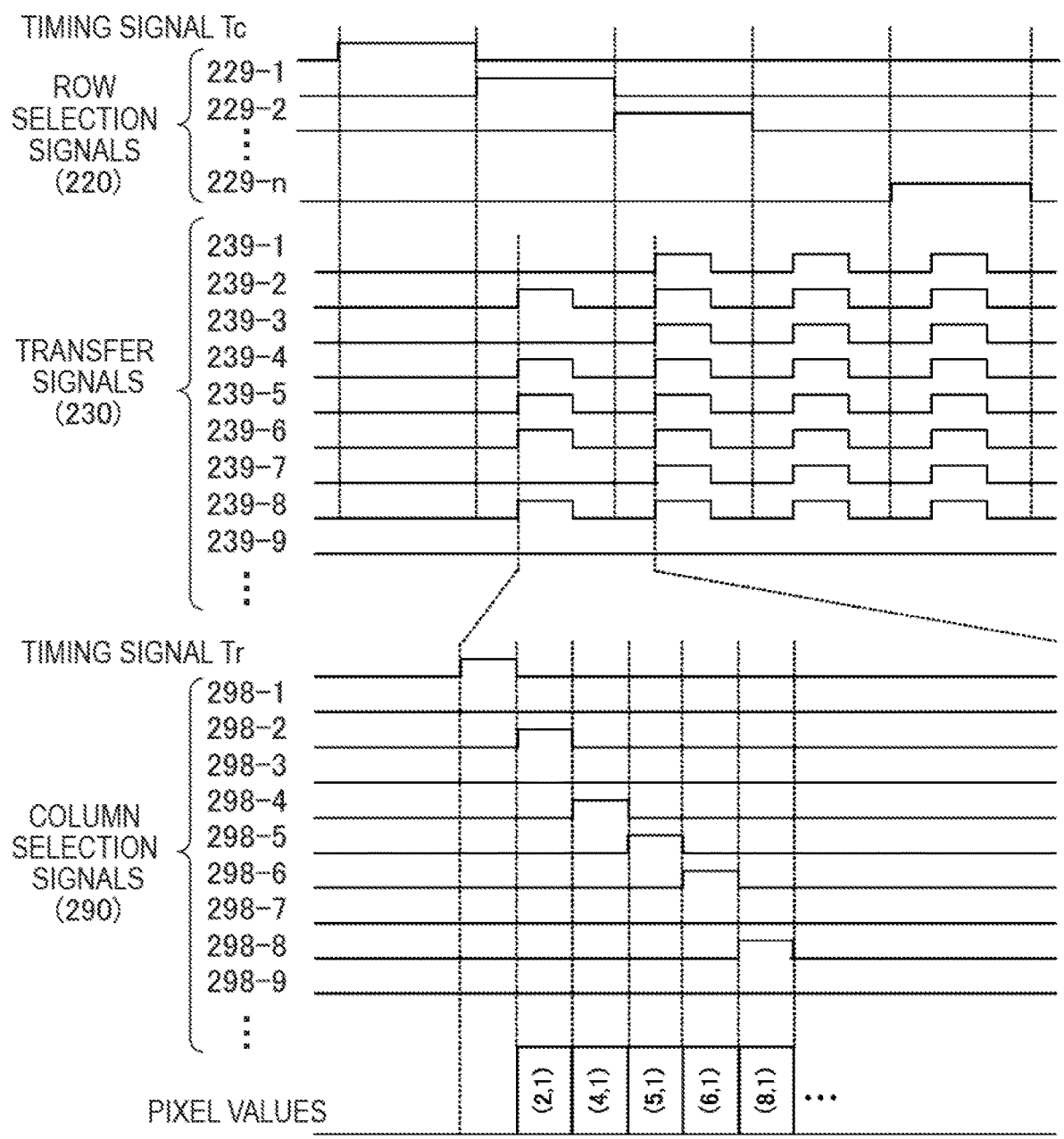
FIG. 10 is a timing chart which shows an example of the operations of the image sensor within a normal pixel output period in the first embodiment.

FIG. 10 is a timing chart which shows an example of the operations of the image sensor 200 within a normal pixel output period in the first embodiment. When the timing signal Tc is input at the start of the normal pixel output period, the row scanning circuit 220 gradually delays this timing signal Tc, and outputs each delayed signal as a row selection signal.

In the case where phase difference lines are selected, the transfer signal generation circuit 230 generates and outputs a transfer signal of the columns except for those of the phase difference pixels, and concurrently drives the pixels of these columns. On the other hand, in the case where normal lines are selected, the transfer signal generation circuit 230 generates a transfer signal of all the columns.

The pixel values of the driven pixels are held in the A/D conversion section 260. Then, when the timing signal Tr is input at the time of selecting the rows, the column scanning circuit 290 gradually delays this timing signal Tr, and outputs each delayed signal as a column selection signal for sequentially selecting each of the columns. However, in the case where phase difference lines are selected, the column scanning circuit 290 generates a column selection signal of the columns except for those of the phase difference pixels. On the other hand, in the case where normal lines are selected, the column scanning circuit 290 generates a column selection signal of all the columns.

For example, consider a case where the first row is a phase difference line, and phase difference pixels are arranged in the first, third, seventh and ninth columns of the first row. In this case, when the first row is selected by the row scanning circuit 220, the pixels of the second, fourth, fifth, sixth and eighth columns are concurrently driven by the transfer signal generation circuit 230, and the pixel values of these columns are sequentially read by the column scanning circuit 290.

Further, in the case where the second row is a normal line, when the second row is selected by the row scanning circuit 220, the pixels of all the columns are concurrently driven by the transfer signal generation circuit 230, and the pixel values of these pixels are sequentially read by the column scanning circuit 290.

Since the row selection signals, such as exemplified in FIG. 10, are signals in which the timing signal Tc has been delayed, the length of the normal pixel output period is changed by changing the on period of this timing signal Tc. Since the normal pixel output period may not be necessary for outputting the phase difference pixels, the normal pixel output period is set to be shorter than the period for outputting all the pixels.

Figure 11:
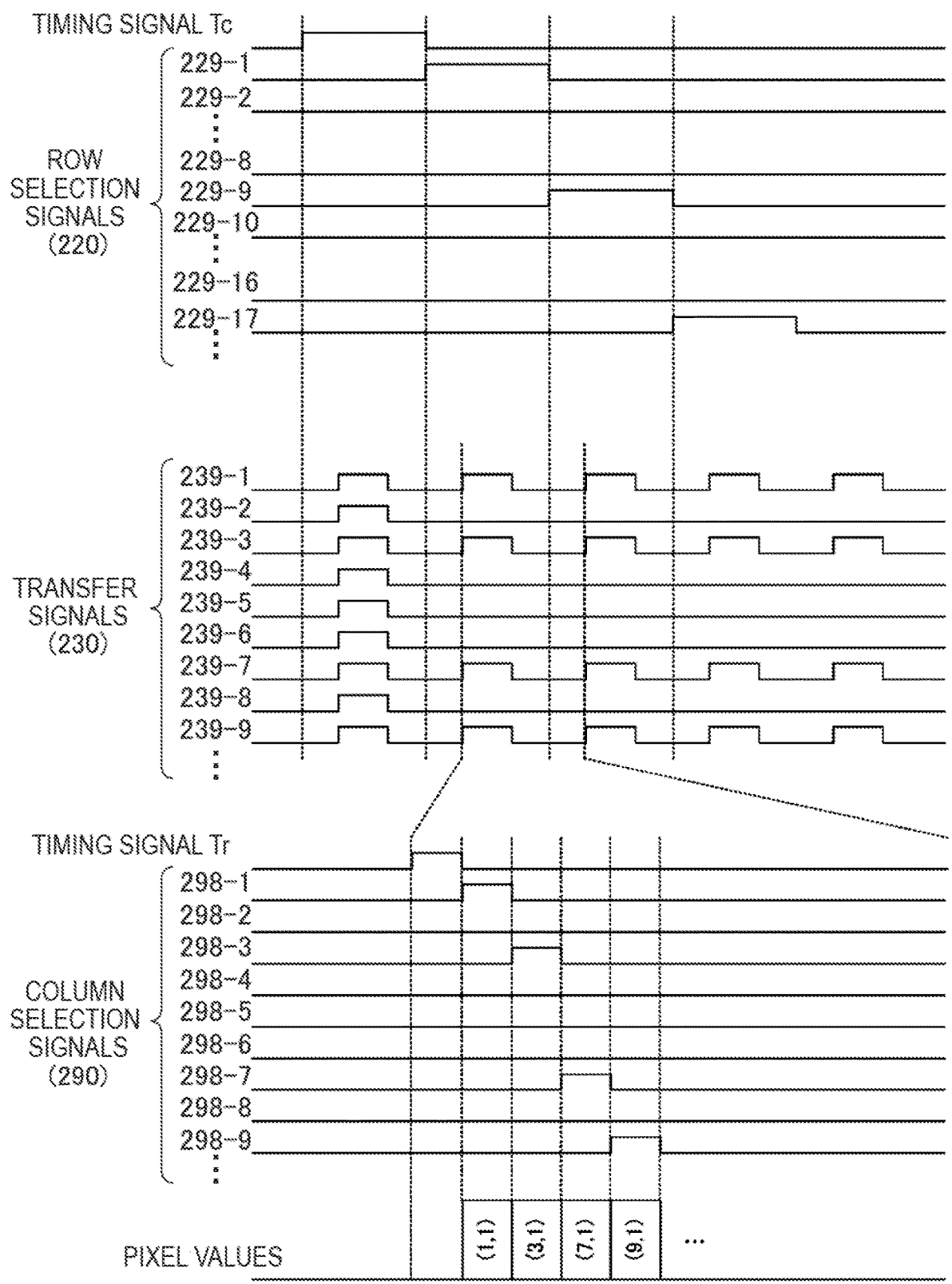
FIG. 11 is a timing chart which shows an example of the operations of the image sensor within a phase difference pixel output period in the first embodiment.

FIG. 11 is a timing chart which shows an example of the operations of the image sensor 200 within a phase difference pixel output period in the first embodiment. When the timing signal Tc is input at the start of the phase difference pixel output period, the row scanning circuit 220 gradually delays this timing signal Tc, and outputs each delayed signal as a row selection signal.

The transfer signal generation circuit 230 generates and outputs the transfer signal of the columns in which the phase difference pixels are arranged, synchronized with the timing which the phase difference lines are selected, and concurrently drives the pixels of these columns.

The pixel values of the driven pixels are held in the A/D conversion section 260. Then, when the timing signal Tr is input at the time of selecting the phase difference lines, the column scanning circuit 290 gradually delays this timing signal Tr, and outputs each delayed signal as a column selection signal for sequentially selecting each of the columns.

For example, consider a case where the first row is a phase difference line, and phase difference pixels are arranged in the first, third, seventh and ninth columns of the first row. In this case, when the first row is selected by the row scanning circuit 220, the pixels of the first, third, seventh and ninth columns are concurrently driven by the transfer signal generation circuit 230, and the pixel values of these columns are sequentially read by the column scanning circuit 290.

The length of the phase difference pixel output period is changed by changing the on period of the timing signal Tc input at the start of the phase difference pixel output period. Since the phase difference pixel output period may not be necessary for outputting the normal pixels, the phase difference pixel output period is set to be shorter than the period for outputting all the pixels.

Figure 12:
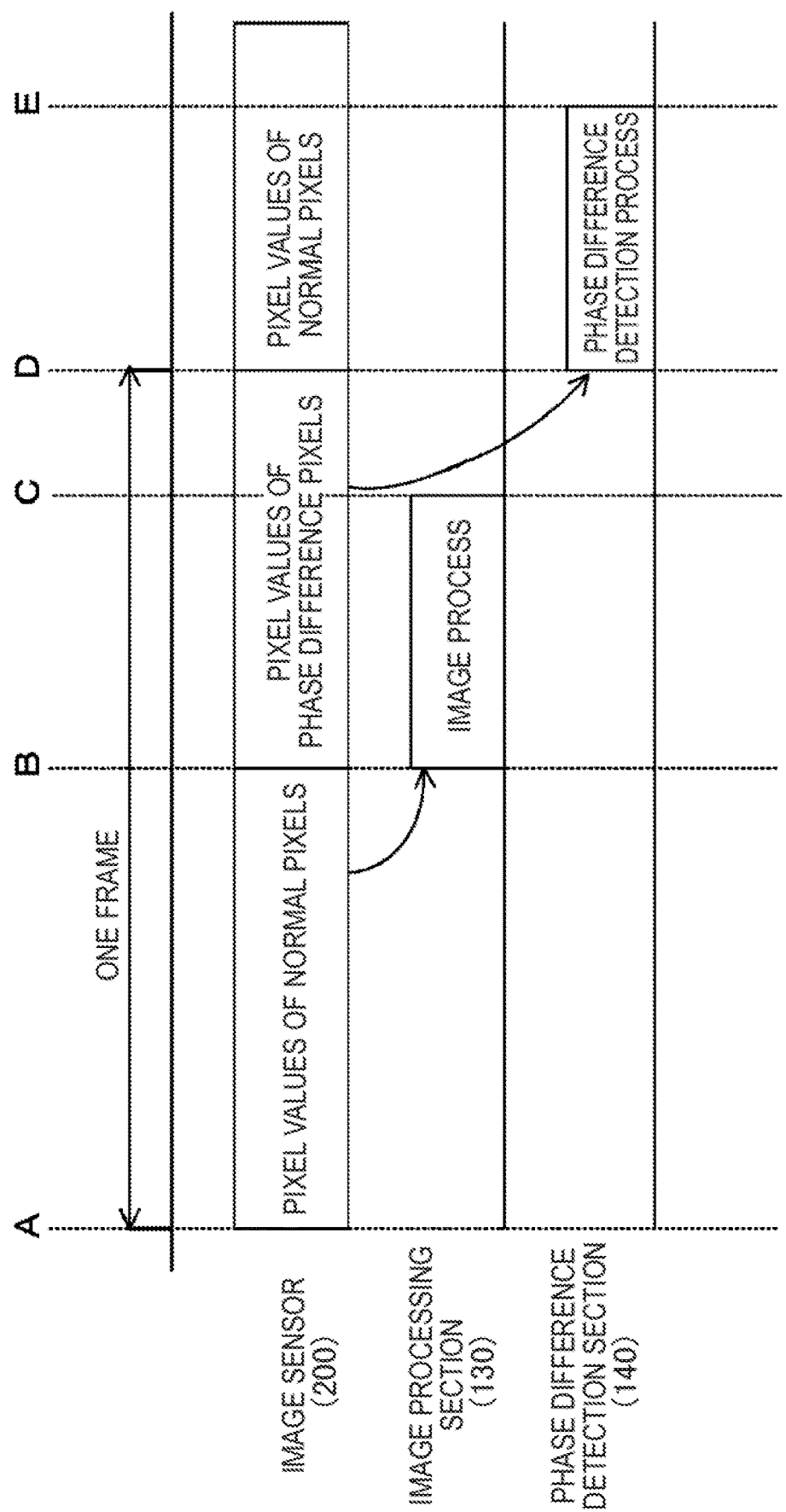
FIG. 12 is a timing chart which shows an example of the operations of the imaging apparatus in the first embodiment.

FIG. 12 is a timing chart which shows an example of the operations of the imaging apparatus 100 in the first embodiment. A period when one image (frame) is captured is divided into the normal pixel output period and the phase difference pixel output period. As described above, since the normal pixel output period may not be necessary for outputting all the pixels, it is set to be shorter in comparison with the case of outputting all the pixels. Similarly, the phase difference pixel output period is set to be shorter than the case of outputting all the pixels. When the normal pixel output period starts at a time A, the image sensor 200 sequentially outputs the pixel values of the normal pixels to the image processing section 130, up until a time B when this period ends. Then, when the phase difference pixel output period starts at time B, the image sensor 200 sequentially outputs the pixel values of the phase difference pixels to the phase difference detection section 140, up until a time D when this period ends.

The image processing section 130 starts an image process at time B, and this image process ends, for example, at a time C prior to time D when the phase difference pixel output period ends. On the other hand, the phase difference detection section 140 starts a phase difference detection process at time D, and this phase difference detection process ends at a time E.

Since the reading of pixels is completed at a time close to that of time D, if the image sensor 200 has a configuration which reads all of the pixels, the image processing section 130 may not be able to start the image process if this time has not elapsed. However, the image processing section 130 can start the image process at time B prior to time D, by the image sensor 200 reading only the normal pixels earlier. Therefore, the speed of the image process is increased in comparison with the case of reading all the pixels.

Note that while there is a configuration in which the normal pixel output period starts earlier than the phase difference pixel output period, there may be a configuration in which, conversely, the phase difference pixel output period starts earlier than the normal pixel output period. In this way, the speed of the phase difference detection process is increased in comparison with the case of reading all the pixels.

In this way, according to the first embodiment of the present disclosure, the imaging apparatus 100 can start either the image process or the phase difference detection process earlier, by reading the pixel values of the normal pixels within the normal pixel output period, and reading the pixel values of the phase difference pixels within the phase difference pixel output period. In this way, the time from the start of imaging until the end of the image process or the phase difference detection process is shortened. Therefore, in the case where the time until the image process ends has been shortened, the time from the start of imaging until the end of displaying or recording of the image is shortened, and the response in the display or recording of the image of the imaging apparatus 100 can be improved. Further, in the case where the time until the phase difference detection process ends has been shortened, the time from the start of imaging until the completion of focusing is shortened, and the response in the focusing of the imaging apparatus 100 can be improved.

2. The Second Embodiment

[Configuration Example of the Image Sensor]

Figure 13:
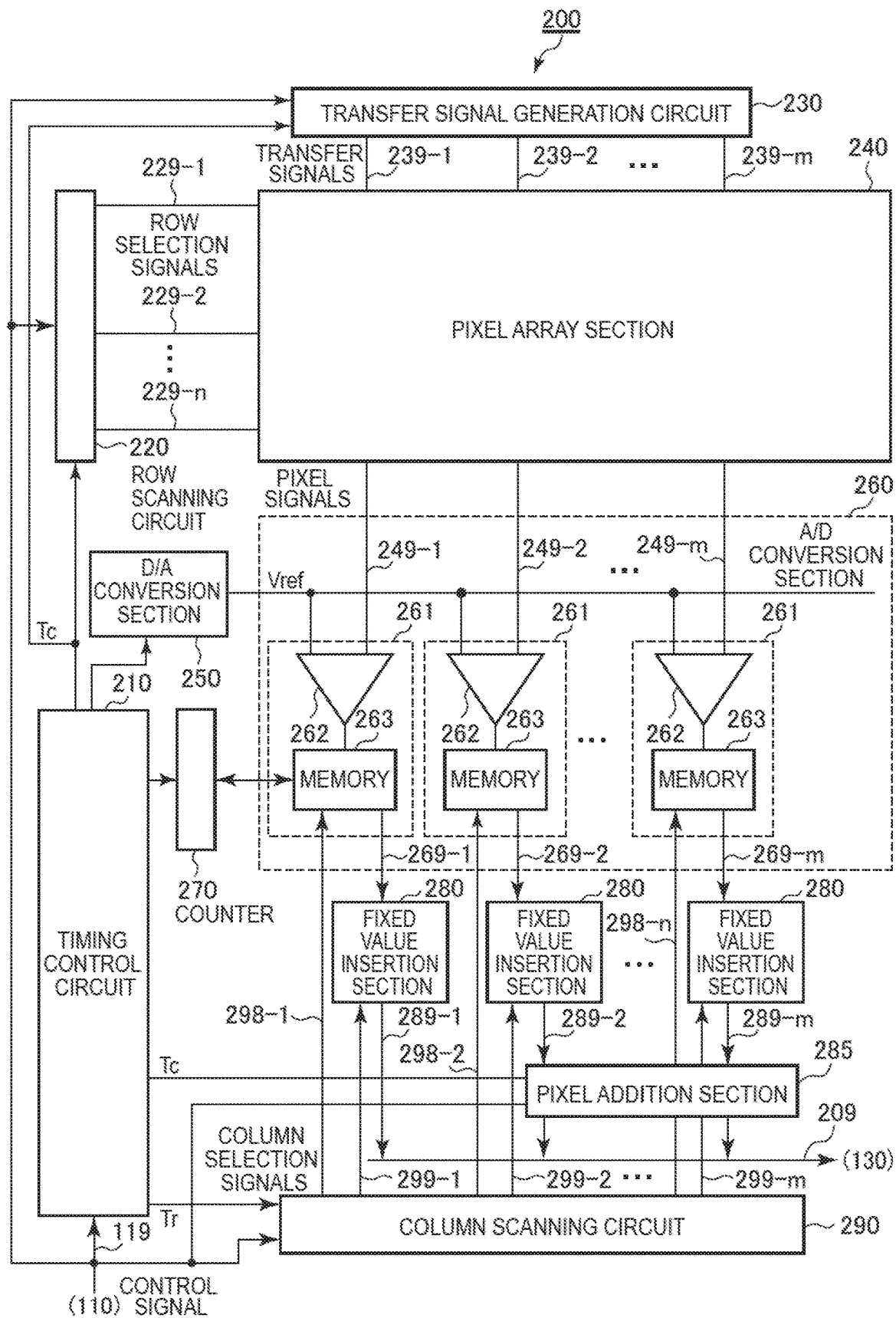
FIG. 13 is a block diagram which shows a configuration example of the image sensor in a second embodiment of the present disclosure.

FIG. 13 is a block diagram which shows a configuration example of the image sensor 200 in the second embodiment. The image sensor 200 of the second embodiment differs from that of the first embodiment in the point that it outputs fixed values instead of the pixel values of the phase difference pixels in the normal pixel output period, and further executes a pixel addition process. Specifically, the image sensor 200 of the second embodiment differs from that of the first embodiment in the point that it includes a plurality of (for example m number of) fixed value insertion sections 280, and a pixel addition section 285.

The fixed value insertion sections 280 insert fixed values instead of the pixel values held in the A/D conversion section 260, in accordance with the control of the column scanning circuit 290. Here, the fixed values are values which are not output as pixel values. For example, assume a case where the A/D conversion section 260 can convert the electric potentials of the signals output from the pixel array section 240 into pixel values of 12 bits at most. In this case, the electric potentials are converted into pixel values of 4096 gradations (0 to 4095). In this configuration, at the time when the A/D conversion section 260 converts the electric potentials into pixel values of 10 bits by a setting mode or the like of the imaging apparatus 100, the pixel values are converted into pixel values of 1024 gradations (0 to 1023). In this case, since the values of 1024 to 4095 are not output as pixel values, any of these values (such as 1024) are set to fixed values.

These fixed value insertion sections 280 are arranged in each column. Also, the pixel values from the A/D conversion section 260 are input to input terminals of the fixed value insertion sections 280 via signal lines of corresponding columns from among the signal lines 269-1 to 269-m. Further, the pixel values from output terminals of the fixed value insertion sections 280 are output to the pixel addition section 285 via signal lines of corresponding columns from among the signal lines 289-1 to 289-m. However, the pixel values of columns which are not the targets of pixel addition (for example, the first column) are directly output to the image processing section 130.

The column scanning circuit 290 of the second embodiment controls the fixed value insertion sections 280 by outputting switching signals to the fixed value insertion sections 280, and inserts fixed values in the order in which the pixel values of the phase difference pixels are read, within the normal pixel output period. Further, the column scanning circuit 290 selects all columns in each of the rows, within the normal pixel output period. On the other hand, the column scanning circuit 290 does not insert fixed values within the phase difference pixel output period. The switching signals are set, for example, to a high level in the case of inserting fixed values, and are set to a low level in the case of not inserting fixed values.

The pixel addition section 285 adds the pixel values of a plurality of pixels having a predetermined positional relation within the rows, and outputs the pixel values to the image processing section 130, in accordance with the control signal. A signal which indicates whether or not pixel addition is performed is further included in the control signal of the second embodiment.

For example, in the case where pixel addition is performed in the rows in which B pixels are arranged in the second, fourth and sixth columns, the pixel addition section 285 adds the pixel values of the second, fourth and sixth columns, and outputs the pixel values as the pixel values of one B pixel. However, in the case where phase difference pixels are included in the plurality of pixels having a predetermined positional relation, the pixel addition section 285 adds the fixed values which the fixed value insertion section 280 has inserted, and the pixel values of the normal pixels. For example, in the case where, in the first row, normal pixels are arranged in the third column, and phase difference pixels are arranged in the fifth and seventh columns, the pixel addition section 285 adds and outputs two fixed values to the pixel values of the third column.

While the resolution of the image decreases by pixel addition, the sensitivity of each pixel increases. Further, since the output pixel number becomes less than that of the case where pixel addition is not performed, the speed of the image process and the phase difference detection process is increased.

[Configuration Example of the Fixed Value Insertion Section]

Figure 14:
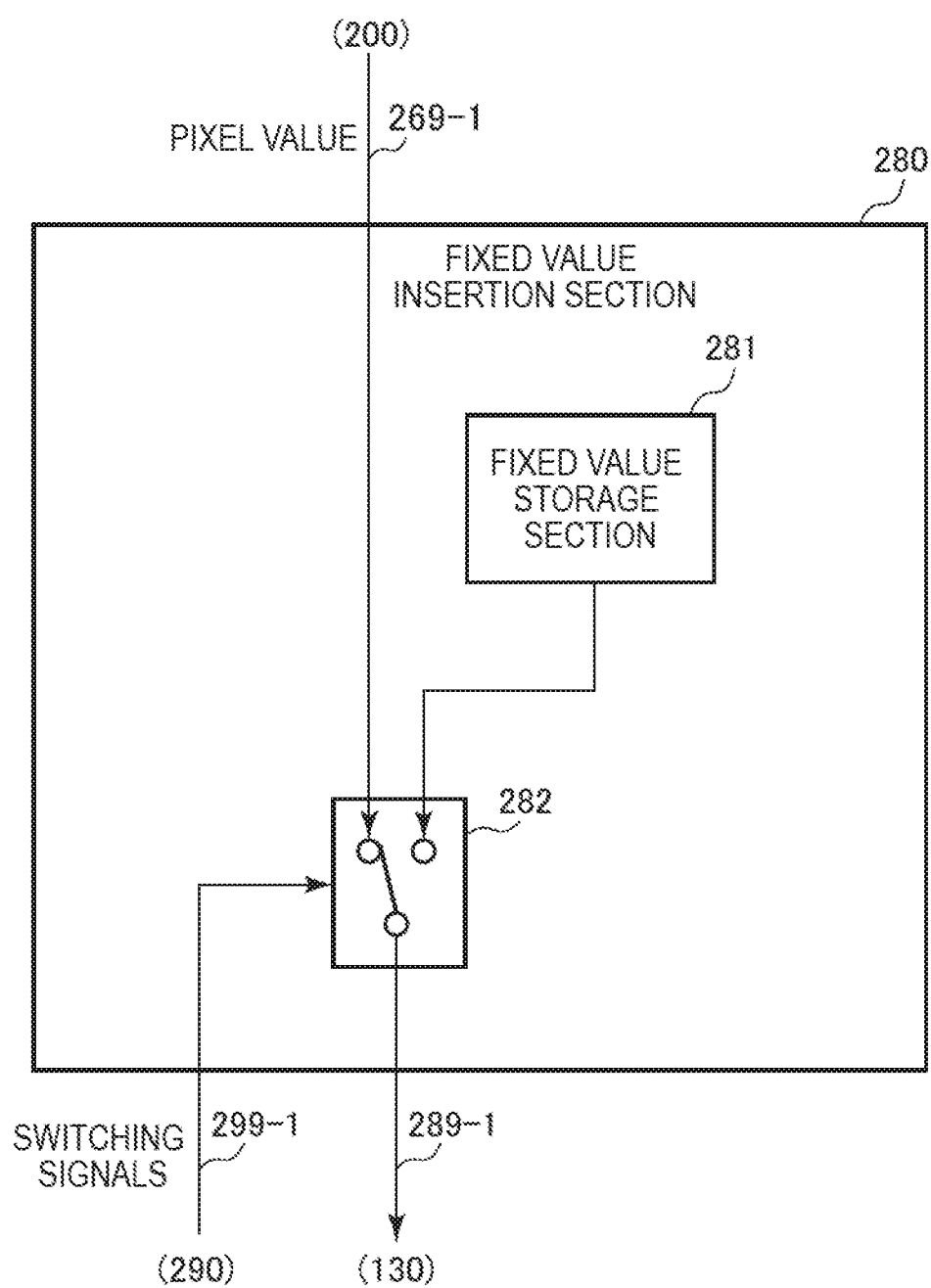
FIG. 14 is a block diagram which shows a configuration example of a fixed value insertion section in the second embodiment.

FIG. 14 is a block diagram which shows a configuration example of the fixed value insertion section 280 in the second embodiment. This fixed value insertion section 280 includes a fixed value storage section 281 and a selector 282. The fixed value storage section 281 stores the fixed values. The selector 282 outputs either the fixed values or the pixel values, in accordance with the switching signals from the column scanning circuit 290. This selector 282 includes two input terminals and an output terminal. One of the input terminals is connected to the A/D conversion section 260, and the other input terminal is connected to the fixed value storage section 281. For example, in the case where a high level switching signal is input, the selector 282 outputs fixed values, and in the case where a low level switching signal is input, the selector 282 outputs the pixel values from the A/D conversion section 260.

[Configuration Example of the Column Scanning Circuit]

Figure 15:
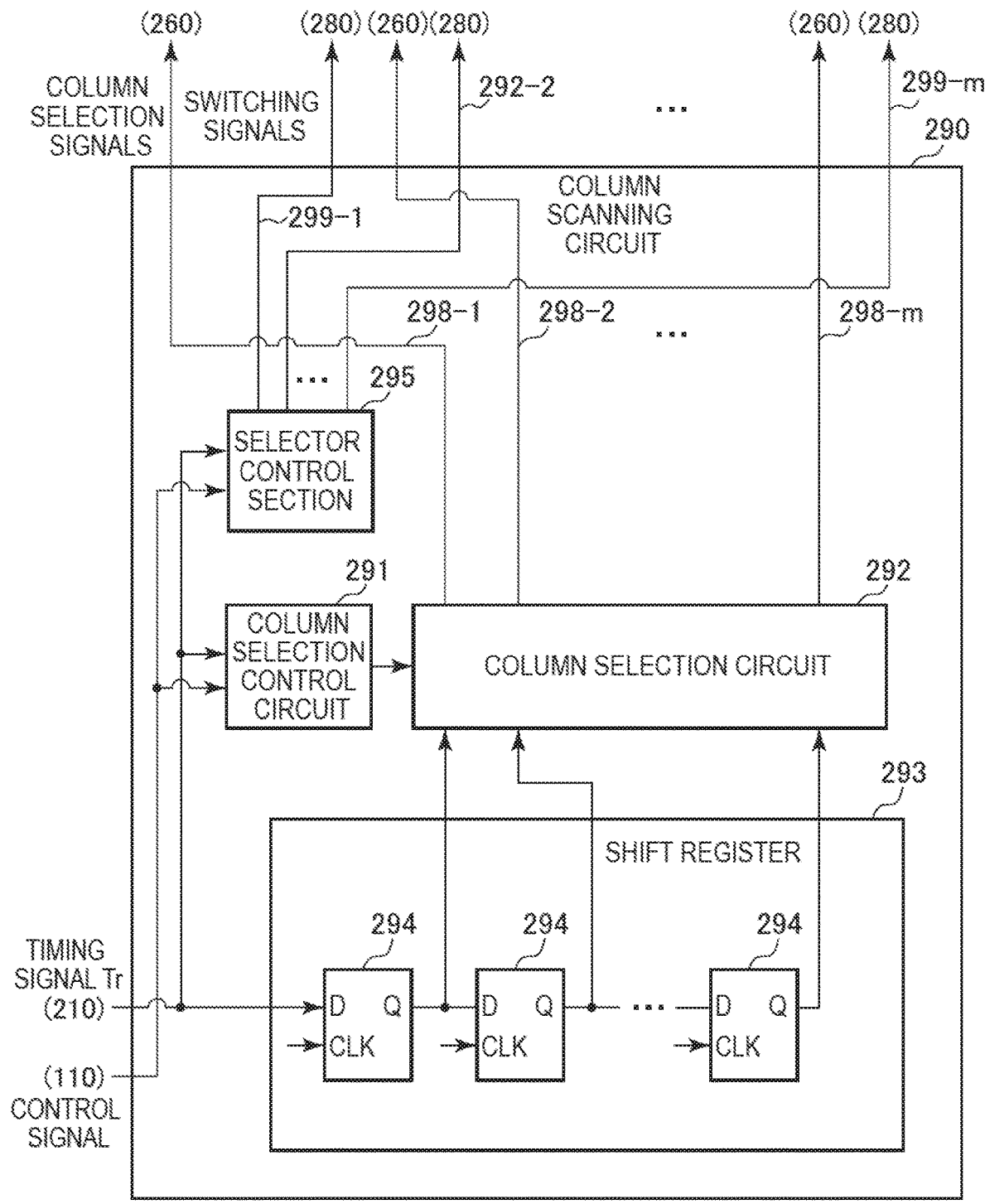
FIG. 15 is a block diagram which shows a configuration example of the column scanning circuit in the second embodiment.

FIG. 15 is a block diagram which shows a configuration example of the column scanning circuit 290 in the second embodiment. The column scanning circuit 290 of the second embodiment differs from that of the first embodiment in the point that it further includes a selector control section 295. The selector control section 295 transmits high level switching signals, and inserts fixed values, to the fixed value insertion sections 280 of the columns in which the phase difference pixels are arranged, within the normal pixel output period. On the other hand, the selector control section 295 transmits low level switching signals, and does not insert fixed values, to all of the fixed value insertion sections 280, within the phase difference pixel output period.

Further, in the case where pixel addition is not performed, the column selection control circuit 291 selects all of the columns in the normal pixel output period. On the other hand, in the case where pixel addition is performed, the column selection control circuit 291 concurrently selects the plurality of columns targeted for pixel addition in the normal pixel output period.

Note that while the column scanning circuit 290 has a configuration which controls the fixed value insertion sections 280, it can have a configuration which does not control the fixed value insertion sections 280. In this configuration, the transfer signal generation circuit 230 may output signals, in which each transfer signal is reversed, to the fixed value insertion sections 280 as switching signals of the columns corresponding to these transfer signals.

[Configuration Example of the Image Processing Section]

Figure 16:
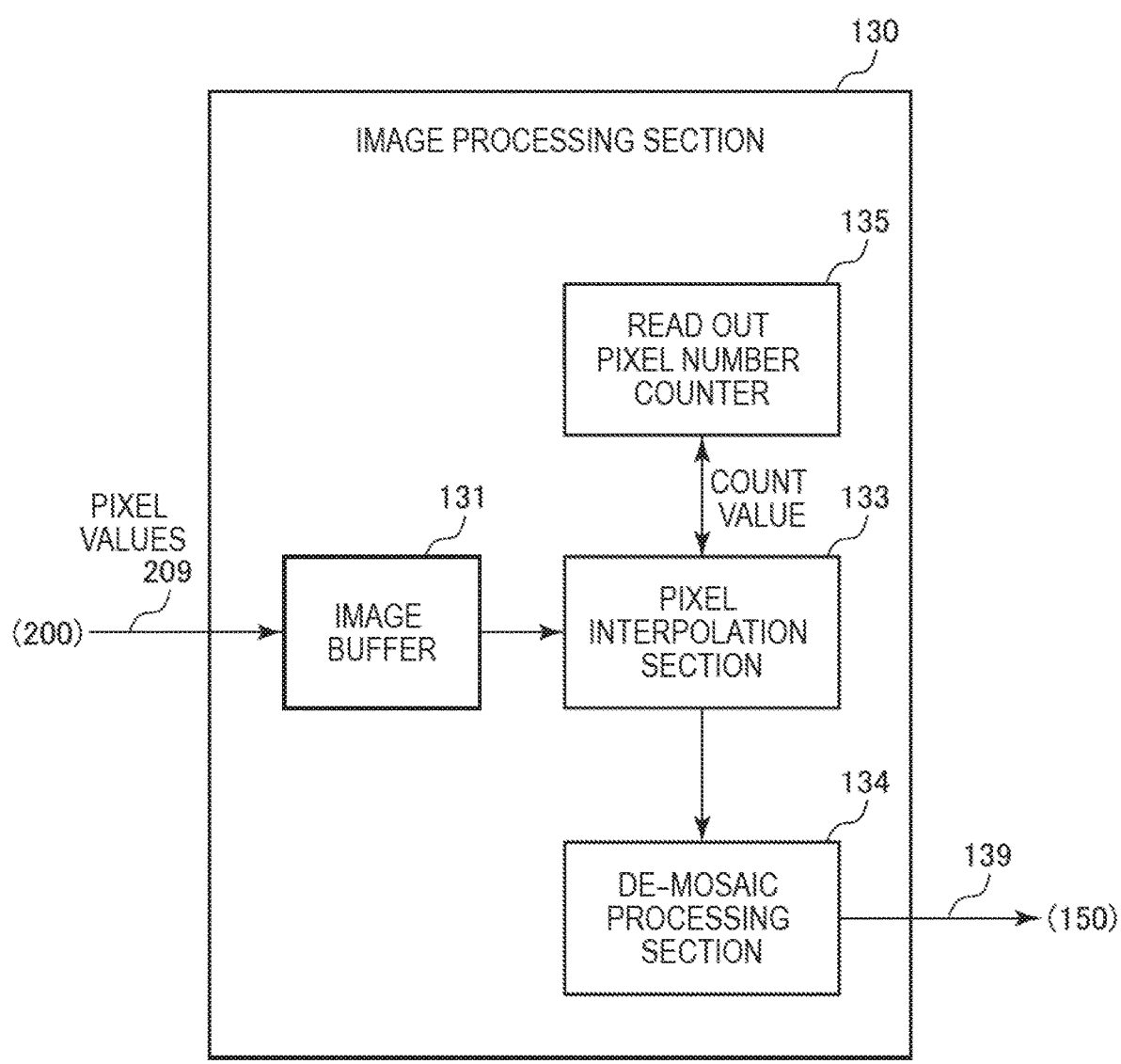
FIG. 16 is a block diagram which shows a configuration example of the image processing section in the second embodiment.

FIG. 16 is a block diagram which shows a configuration example of the image processing section 130 in the second embodiment. The image processing section 130 differs from that of the first embodiment in the point that it includes a read out pixel number counter 135 instead of the phase difference pixel address storage section 132.

In the case where pixel addition is not performed, the pixel interpolation section 133 of the second embodiment interpolates the pixels of the fixed values in the image held in the image buffer 131. Since the above described fixed values are values which are not used as pixel values, the pixel interpolation section 133 can judge whether or not there are phase difference pixels by the fixed values, even without reading the address from the phase difference pixel address storage section 132. In this way, the phase difference pixel address storage section 132 may become unnecessary.

On the other hand, in the case where pixel addition is performed, the pixel interpolation section 133 measures the pixel number in the read out pixel number counter 135 each time the pixel values are read from the image buffer 131. The pixel interpolation section 133 judges whether or not the read out pixel values include fixed values, based on a count value. For example, consider a case where, in the first row, phase difference pixels are arranged in the first, fifth and seventh columns, the pixel values of the second, fourth and sixth columns are added, and the pixel values of the third column and two fixed values are added. In this case, the pixel values (that is, the added values) read initially in the first row do not include fixed values, and the added values read in the second include fixed values.

The pixel interpolation section 133 performs interpolation by subtracting the fixed pixels from the pixel values including the fixed values, and multiplying predetermined multiplied values with the pixel values after subtraction. For example, the pixel interpolation section 133 subtracts these fixed values, in the values to which one pixel value and two fixed values are added, and triples the pixel values after subtraction. Further, in the case where two pixel values and a fixed value are added, the pixel interpolation section 133 may set the values after subtracting the fixed values to 1.5 times that of the values.

[Operation Example of the Image Sensor]

Figure 17:
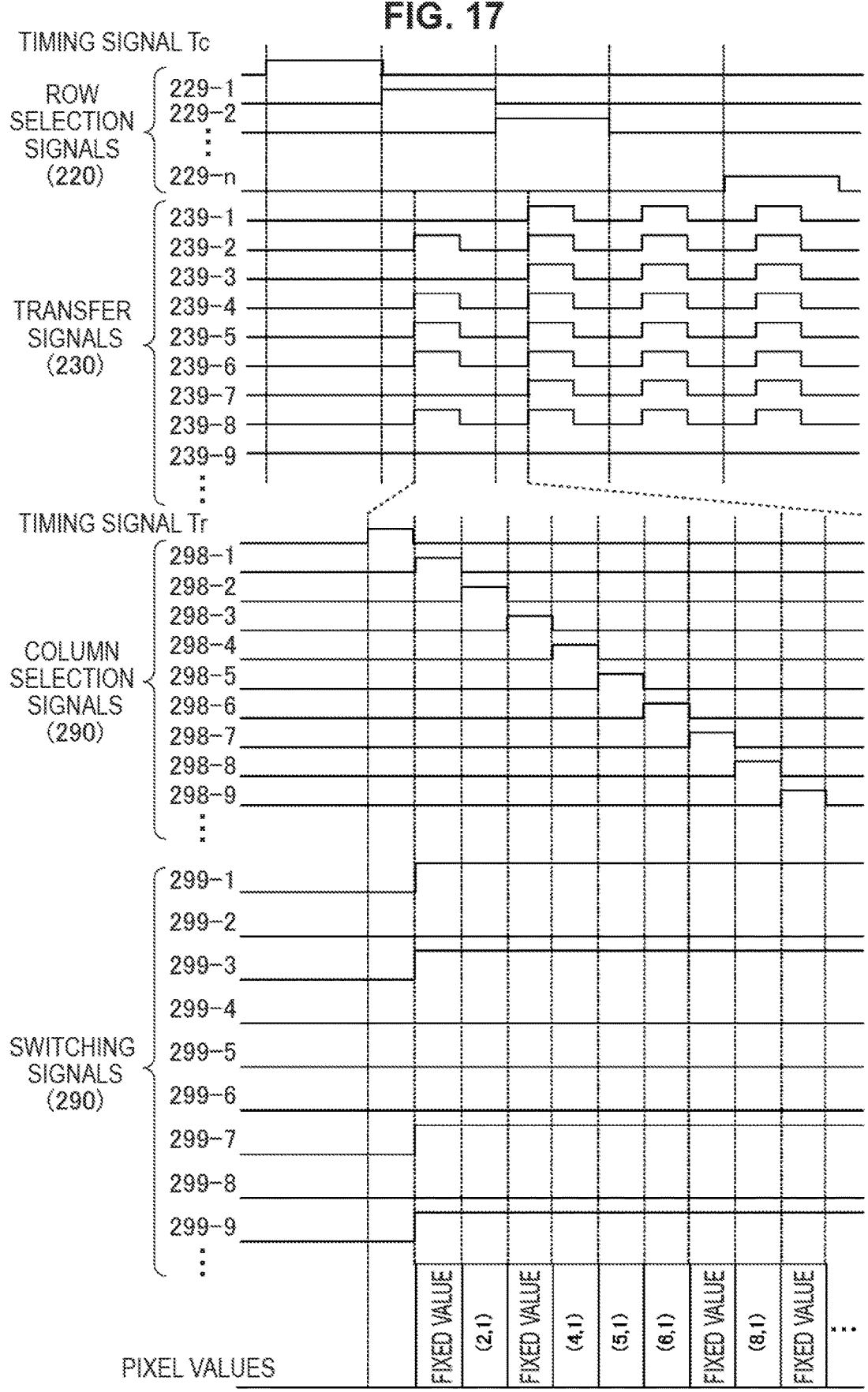
FIG. 17 is a timing chart which shows an example of the operations of the image sensor within a normal pixel output period, in the case where pixel addition is not performed, in the second embodiment.

FIG. 17 is a timing chart which shows an example of the operations of the image sensor 200 within a normal pixel output period, in the case where pixel addition is not performed, in the second embodiment. The timing of the generation of the row selection signals and the transfer signals of the second embodiment are identical to those of the first embodiment.

The column scanning circuit 290 of the second embodiment sequentially selects all of the columns. Further, the column scanning circuit 290 of the second embodiment transfers high level switching signals, and inserts fixed values, to the fixed value insertion sections 280 of the columns in which the phase difference pixels are arranged. For example, in the first row, phase difference pixels are arranged in the first, fifth, seventh and ninth columns, and the column scanning circuit 290 outputs high level switching signals to the fixed value insertion sections 280 of the first, fifth, seventh and ninth columns at the time of selecting the first row, and transfers low level switching signals to the fixed value insertion sections 280 other than those described above. Also, in the case where phase difference pixels are not arranged in the second row, the column scanning circuit 290 sets all of the switching signals to a low level at the time of selecting the second row. As a result, fixed values are inserted in the order corresponding to the pixel values of the phase difference pixels, in the reading of the pixel values.

Since fixed values are inserted in the case where pixel addition is not performed, such as exemplified in FIG. 17, the normal pixel output period does not change with the time when the pixel values of all the pixels are output, and the speed of the image process does not increase. Accordingly, in the case where pixel addition is not performed, the image sensor 200 starts the phase difference pixel output period earlier than the normal pixel output period. In this way, the speed of the phase difference detection process increases. On the other hand, in the case where pixel addition is performed, the image sensor 200 may perform either the normal pixel output period or the phase difference pixel output period earlier, in a similar way to that of the first embodiment.

Figure 18:
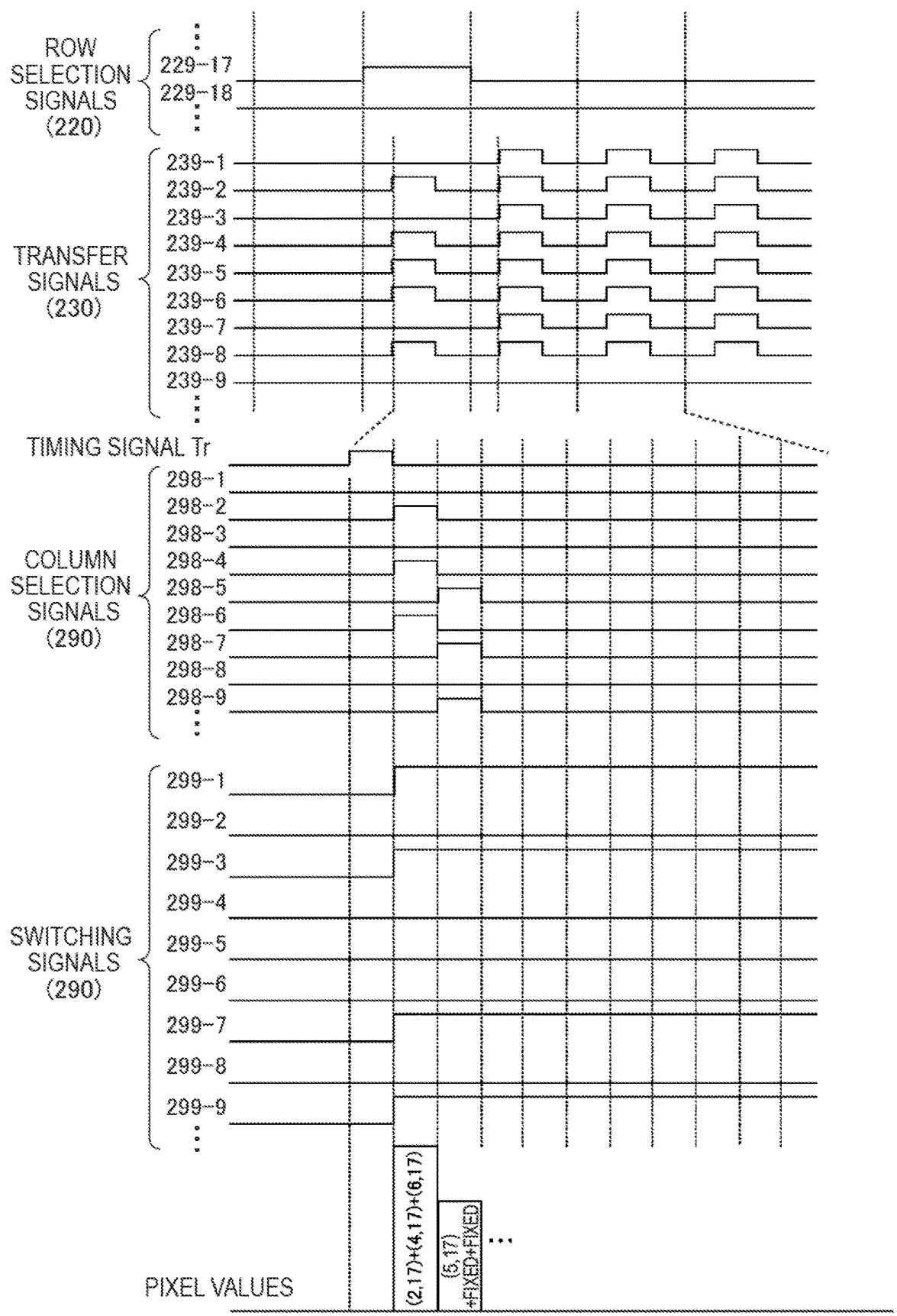
FIG. 18 is a timing chart which shows an example of the operations of the image sensor within a normal pixel output period, in the case where pixel addition is performed, in the second embodiment.

FIG. 18 is a timing chart which shows an example of the operations of the image sensor 200 within a normal pixel output period, in the case where pixel addition is performed, in the second embodiment.

The column scanning circuit 290 of the second embodiment concurrently selects the plurality of columns targeted for pixel addition. For example, in the case where, in the first row, the second, fourth, and sixth columns are added, and the third, fifth and seventh columns are added, the column scanning circuit 290 concurrently selects the second, fourth and sixth columns, and then concurrently selects the third, fifth and seventh columns. As a result, each of the added values is output as a pixel value.

Figure 19:
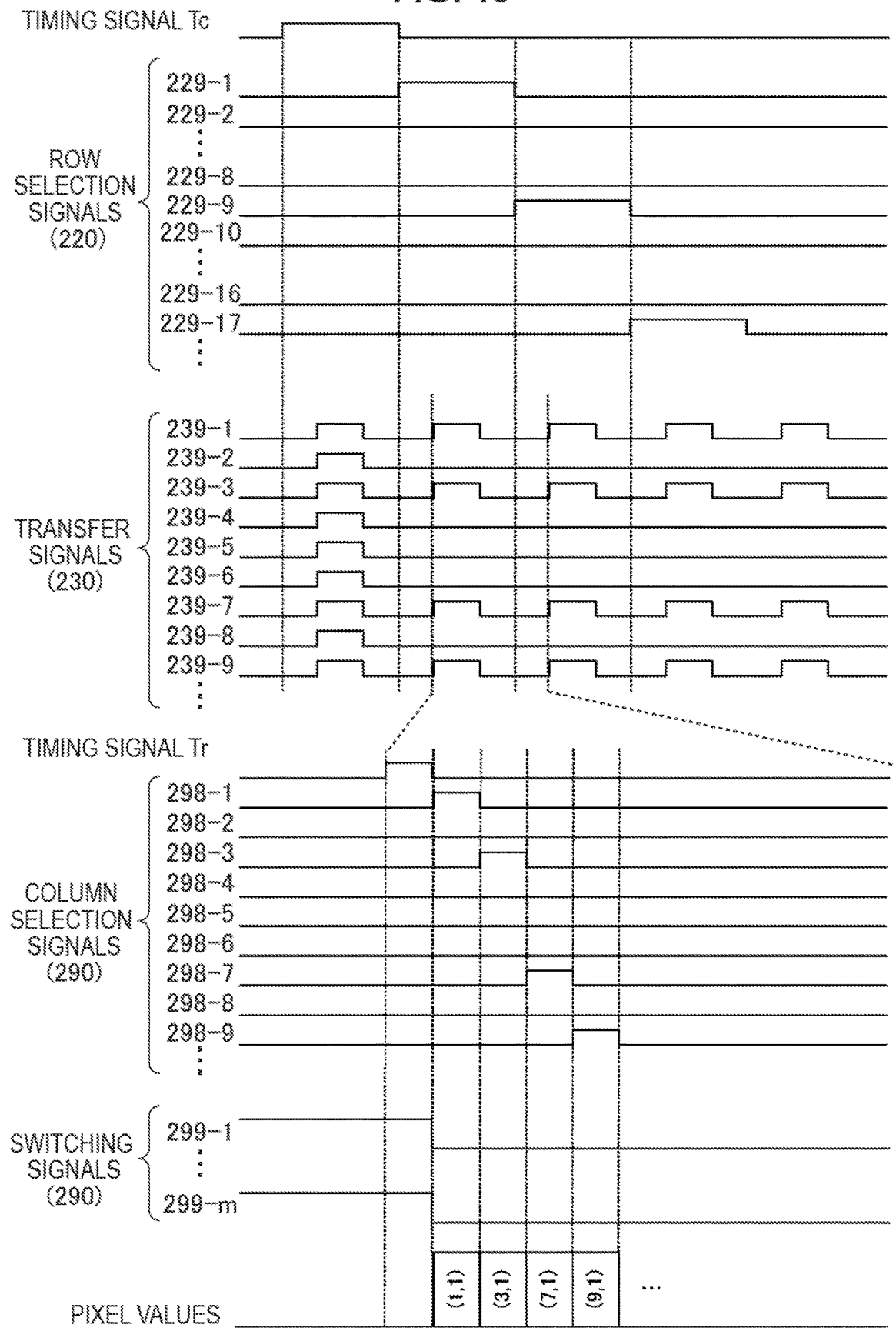
FIG. 19 is a timing chart which shows an example of the operations of the image sensor within a phase difference pixel output period in the second embodiment.

FIG. 19 is a timing chart which shows an example of the operations of the image sensor 200 within a phase difference pixel output period in the second embodiment. The timing of the generation of the row selection signals, the transfer signals, and the column selection signals of the second embodiment are identical to those of the first embodiment. On the other hand, the switching signals are all set to a high level by the column scanning circuit 290.

Figure 20:
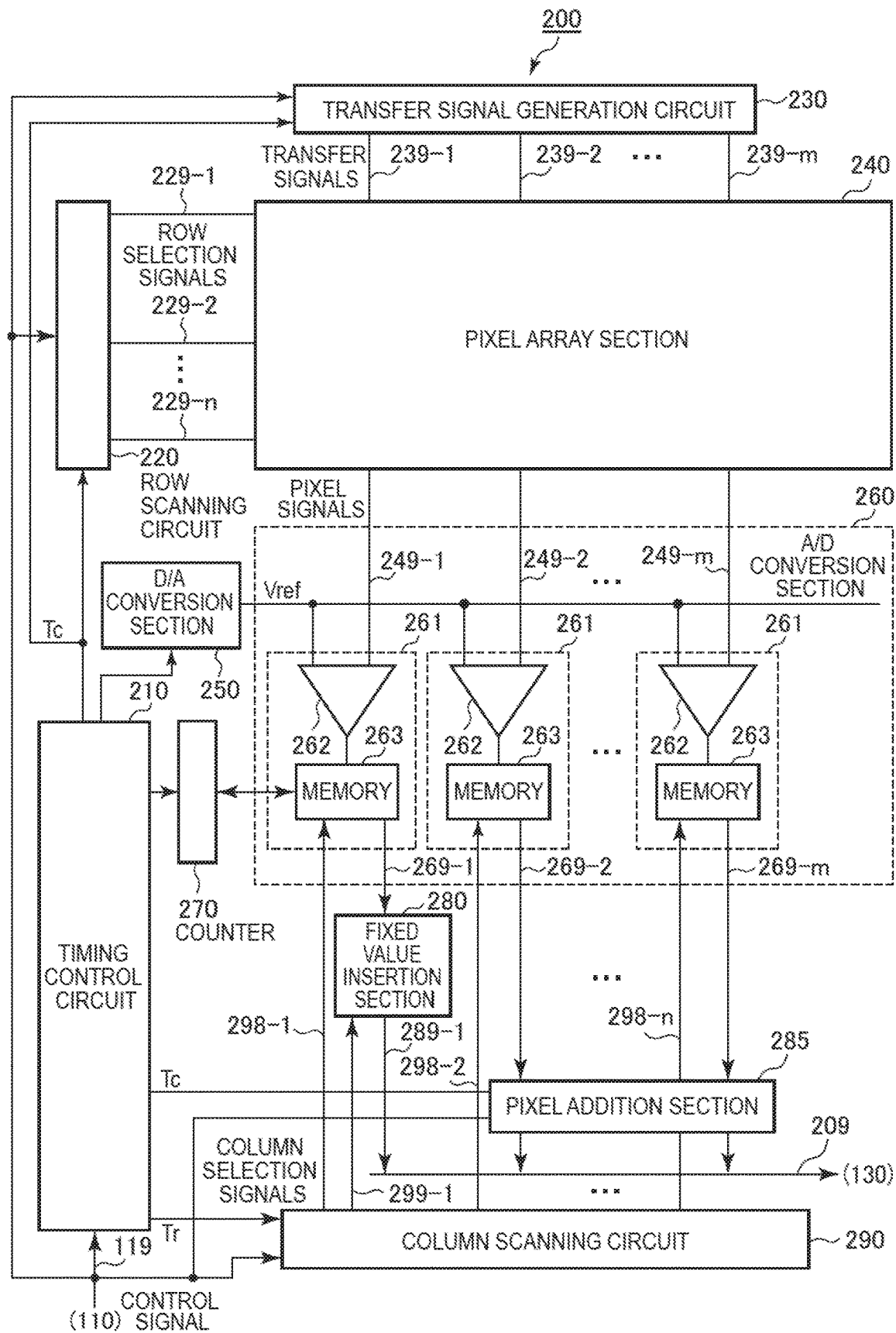
FIG. 20 is a block diagram which shows a configuration example of the image sensor in a third embodiment of the present disclosure.

Note that while the image sensor 200 includes the fixed value insertion sections 280 in all of the columns, it may include the fixed value insertion sections 280 only in the columns in which the phase difference pixels are arranged, such as exemplified in FIG. 20. In this way, while the production of the image sensor 200 may produce some difficulties in order for the fixed value insertion sections 280 to be discretely arranged, the hardware will be reduced.

In this way, according to the second embodiment of the present disclosure, the image processing section 130 can interpolate the phase difference pixels, even if the positions of the phase difference pixels are not stored, by the image sensor 200 inserting fixed values in the order corresponding to the positions of the phase difference pixels.

Further, since the read out pixel number becomes less, due to the pixel addition section 285 adding the pixel values of the plurality of pixels having a predetermined positional relation, the imaging apparatus 100 shortens the time from the start of imaging until the end of the image process and phase difference detection process, even in the case where pixel addition is not performed. Therefore, the time from the start of imaging until the end of focusing is shortened, and the response in the focusing of the imaging apparatus 100 can be improved.

3. The Third Embodiment

[Operation Example of the Image Sensor]

Figure 21:
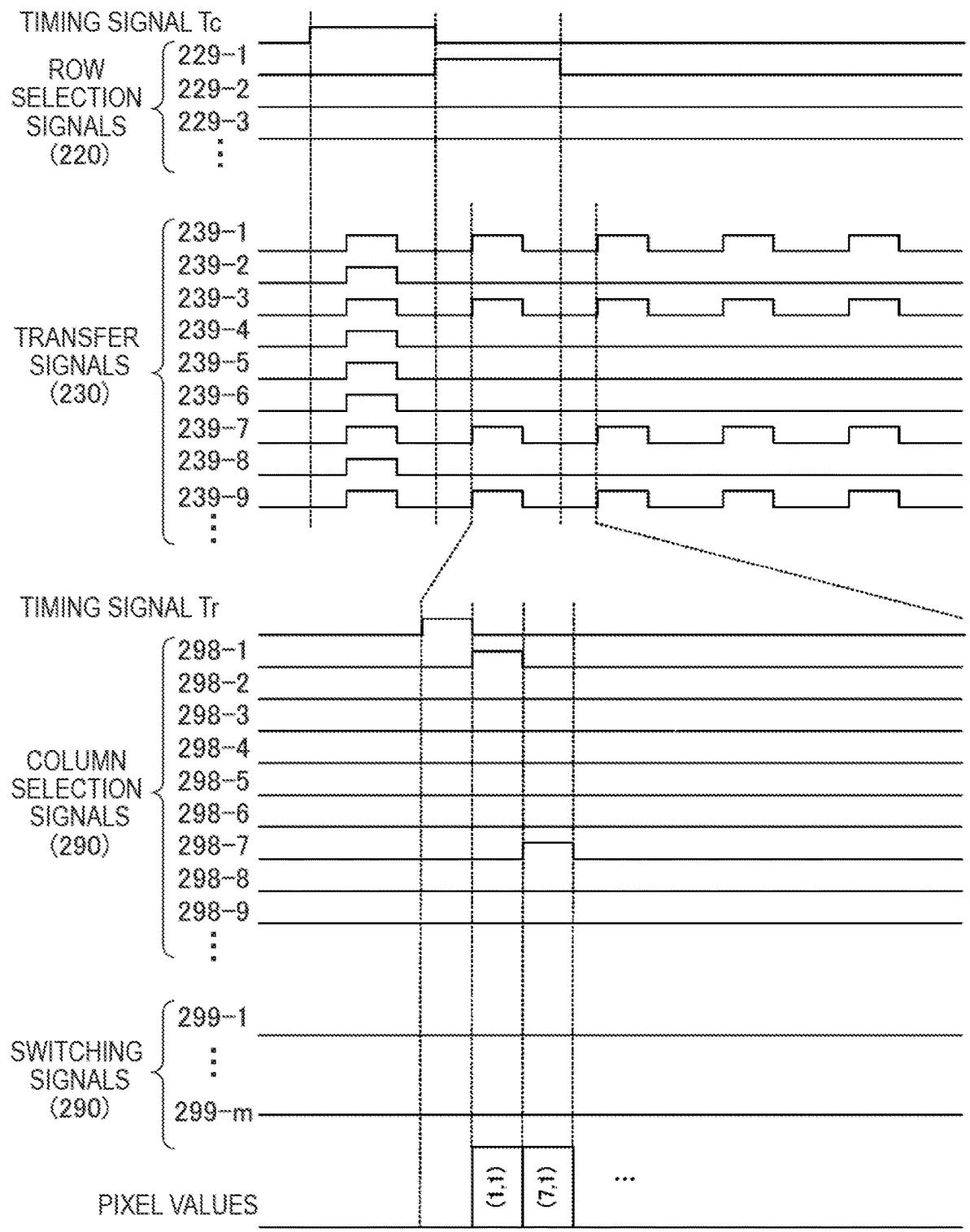
FIG. 21 is a timing chart which shows an example of the operations of the image sensor within a phase difference pixel output period in the third embodiment.

FIG. 21 is a timing chart which shows an example of the operations of the image sensor 200 within a phase difference pixel output period in the third embodiment. The image sensor 200 of the third embodiment differs from that of the first embodiment in the point that it executes scanning of all the phase difference lines twice in the phase difference pixel output period, and reads one of the left side pixels and right side pixels in the first scanning, and reads the other in the second scanning. Specifically, the row scanning circuit 220 executes scanning of all the phase difference lines twice within the phase difference pixel output period. Also, the column scanning circuit 290 selects, for example, only the left side pixels in the first scanning, and selects only the right side pixels in the second scanning.

In the case where, in the first row, the left side pixels are arranged in the first and seventh columns, and the right hand pixels are arranged in the third and ninth columns, at the time when the first row is selected in the first scanning, for example, the column scanning circuit 290 sequentially selects the pixels of the first and sevenths columns. Then, at the time when the first row is selected in the second scanning, the column scanning circuit 290 sequentially selects the pixels of the third and ninth columns.

Figure 22:
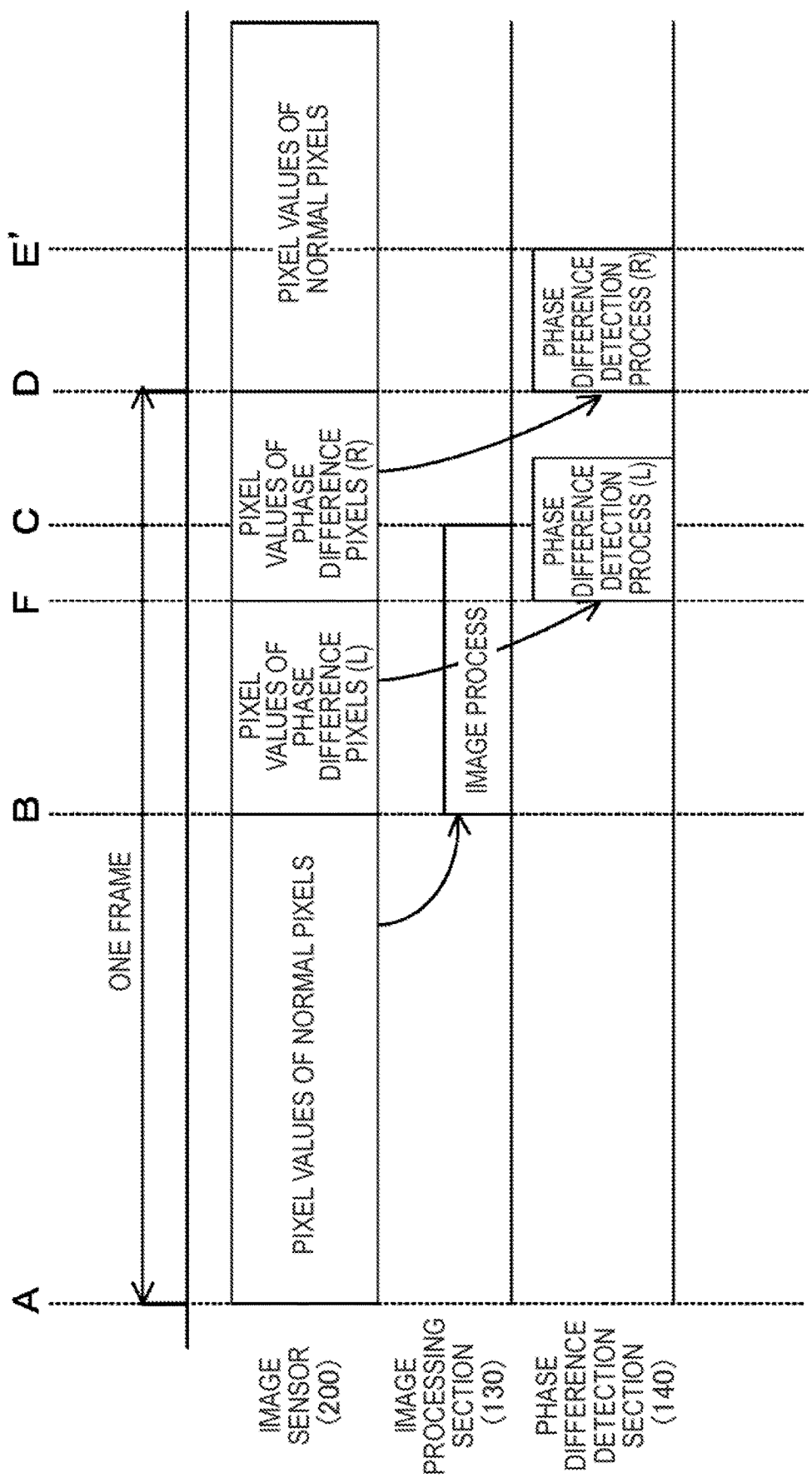
FIG. 22 is a timing chart which shows an example of the operations of the image sensor in the third embodiment.

FIG. 22 is a timing chart which shows an example of the operations of the image sensor 200 in the third embodiment. The phase difference pixel output period from time B to D is divided into the period from time B to F, and the period from time F to D. The image sensor 200 performs a first scan of the phase difference lines and outputs only the left side pixels, within the period from time B to F. Then, the image sensor 200 performs a second scan of the phase difference lines and outputs only the right side pixels, within the period from time F to D. From time F when the output of the left side pixels is completed, the phase difference detection section 140 starts the phase difference detection process, and performs a process which requests a luminance distribution of the left side pixels. Then, from time D when the output of the right side pixels is completed, the phase difference detection section 140 performs a process which requests a luminance distribution of the right side pixels. Since the phase difference detection process starts prior to time D, an end time E' of the phase difference detection process of the third embodiment is earlier than the end time E of the first embodiment, in which the phase difference detection process starts from time D. Therefore, the speed of the phase difference detection process increases.

In this way, according to the third embodiment of the present disclosure, the image sensor 200 can execute the process of either the left side pixels or the right side pixels earlier, by reading the pixel values of either the left side pixel group or the right side pixel group earlier, within the phase difference pixel output period. In this way, the time from the start of imaging until the end of the phase difference detection process is shortened. Therefore, the time from the start of imaging until the completion of focusing is shortened, and the response in the focusing of the imaging apparatus 100 can be improved.

Note that the above described embodiments show examples of embodying the present disclosure, and there is a correspondence between the features in the embodiments and the respective features of the present disclosure. Similarly, there is a correspondence between the features of the present disclosure and the respective features in the embodiments of the present disclosure with the same reference numerals. However, the present disclosure is not limited to the embodiments, and can embody various modifications which do not deviate from the scope of the present disclosure.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image sensor, including:
a plurality of phase difference lines in which a plurality of pixels including phase difference pixels for detecting a phase difference are arranged;
a plurality of normal lines in which a plurality of normal pixels not including the phase difference pixels are arranged;

a row scanning section which selects each of the plurality of phase difference lines and each of the plurality of normal lines within a first period, and selects each of the plurality of phase difference lines within a second period different from the first period; and a column scanning section which outputs pixel values of the plurality of normal pixels in each of the lines selected within the first period, and outputs pixel values of the phase difference pixels in each of the lines selected within the second period.

(2) The image sensor according to (1), further including:

a driving section which concurrently drives each of the plurality of normal pixels in each of the lines selected within the first period, and concurrently drives each of the phase difference pixels in each of the lines selected within the second period; and a pixel value holding section which holds pixel values of the driven normal pixels or the driven phase difference pixels, wherein the column scanning section outputs each of the held pixel values in a predetermined order.

(3) The image sensor according to (2), wherein the column scanning section further outputs fixed values, which are not output as pixel values of pixels, in an order corresponding to positions of the phase difference pixels, in a case where any of the plurality of phase difference lines are selected within the first period.

(4) The image sensor according to (3), further including:

a pixel addition section which adds pixel values of the normal pixels and the fixed values, in a case where the phase difference pixels are included in a plurality of pixels having a predetermined positional relation in each of the lines selected within the first period, and adds the pixel values of the plurality of pixels, in a case where the phase difference pixels are not included in the plurality of pixels having the predetermined positional relation, wherein the column scanning section outputs the added values in each of the lines selected within the first period.

(5) The image sensor according to any one of (1) to (4), wherein each of the plurality of phase difference pixels includes a pair of phase difference pixels for receiving a pair of light beams subjected to pupil division, wherein the row scanning section executes a scanning process twice which selects each of the phase difference lines in the second period, and wherein the column scanning section outputs a pixel value of one of the pair of phase difference pixels in lines selected in a first scanning process within the second period, and outputs a pixel value of the other of the pair of phase difference pixels in lines selected in a second scanning process within the second period.

(6) A method of controlling an image sensor, the method including:

a row scanning procedure in which a row scanning section selects a plurality of phase difference lines in which a plurality of pixels including phase difference pixels for detecting a phase difference are arranged, and a plurality of normal lines in which a plurality of normal pixels not including the phase difference pixels are arranged, within a first period, and selects each of the plurality of phase difference lines within a second period different from the first period; and a column scanning procedure in which a column scanning section outputs pixel values of the plurality of normal pixels in each of the lines selected within the first period, and outputs pixel values of the phase difference pixels in each of the lines selected within the second period.

(7) An imaging apparatus, including:

an image sensor including a plurality of phase difference lines in which a plurality of pixels including phase difference pixels for detecting a phase difference are arranged, a plurality of normal lines in which a plurality of normal pixels not including the phase difference pixels are arranged, a row scanning section which selects each of the plurality of phase difference lines and each of the plurality of normal lines within a first period, and selects each of the plurality of phase difference lines within a second period different from the first period, and a column scanning section which outputs pixel values of the plurality of normal pixels in each of the lines selected within the first period, and outputs pixel values of the phase difference pixels in each of the lines selected within the second period;

an image processing section which generates an image from the output pixel values of the plurality of normal pixels; and a phase difference detection section which detects a phase difference based on the output pixel values of the phase difference pixels.

What is claimed is:

1. An image sensor, comprising:

a plurality of phase difference lines in which a phase difference pixel for detecting a phase difference and a plurality of normal pixels are arranged;

a plurality of normal lines in which a plurality of normal pixels are arranged; and circuitry configured to select the plurality of normal pixels arranged in the plurality of phase difference lines and in the plurality of normal lines within a first period, and select phase difference pixels arranged in the plurality of phase difference lines within a second period different from the first period, wherein the second period overlaps a portion of a period in which image processing based on outputs of the plurality of normal pixels selected in the first period is performed and in which each phase difference line is selected twice in the second period.

2. The image sensor of claim 1, wherein the circuitry comprises transfer signal generation circuitry that drives each of the plurality of normal pixels selected in the plurality of phase difference lines and the plurality of normal lines within the first period and drives each phase difference pixels selected within the second period.

3. The image sensor of claim 2, wherein the transfer signal generation circuitry comprises a transfer control circuit configured to receive a transfer signal and a timing signal and an output control circuit coupled to the transfer control circuit, the output control circuit including a plurality of switches whose states are controlled by the transfer control circuit.

4. The image sensor of claim 2, further comprising pixel value hold circuitry that holds pixel values of normal pixels and phase difference pixels driven by the transfer signal generation circuitry.

5. The image sensor of claim 4, wherein the pixel value hold circuitry comprises one or more memories.

6. The image sensor of claim 1, wherein each phase difference pixel detects a phase difference between light beams.

7. The image sensor of claim 6, wherein each phase difference pixel includes a pair of pixels for both of a pair of light beams subjected to pupil division.

8. An image sensor, comprising:
a first arrangement of pixels having a phase difference pixel for detecting a phase difference and a first plurality of normal pixels;
a second arrangement of pixels having a second plurality of normal pixels; and
circuitry configured to select the first plurality of normal pixels and the second plurality of normal pixels within a first period, and select the phase difference pixel within a second period different from the first period,
wherein the second period overlaps a portion of a period in which image processing based on outputs of normal pixels selected in the first period is performed and in which one or more of the phase difference lines is selected twice in the second period.

9. The image sensor of claim 8, further comprising a plurality of the first arrangement and a plurality of the second arrangement that are configured to form a pixel array.

10. The image sensor of claim 9, wherein each phase difference pixel in the plurality of the first arrangement is selected within the second period.

11. The image sensor of claim 9, wherein the circuitry comprises transfer signal generation circuitry that drives each normal pixels selected in the plurality of the first arrangement and the second arrangement within the first period and drives each phase difference pixels selected within the second period.

12. The image sensor of claim 11, wherein the transfer signal generation circuitry comprises a transfer control circuit configured to receive a transfer signal and a timing signal and an output control circuit coupled to the transfer control circuit, the output control circuit including a plurality of switches whose states are controlled by the transfer control circuit.

13. The image sensor of claim 11, further comprising one or more memories that holds pixel values of normal pixels and phase difference pixels driven by the transfer signal generation circuitry.

14. The image sensor of claim 8, wherein the phase difference pixel includes a pair of pixels for both of a pair of light beams subjected to pupil division and detects a phase difference between the pair of pixels.

15. The image sensor of claim 8, wherein the first plurality of normal pixels, second plurality of normal pixels and the phase difference pixel comprise pixels captured in an image frame, and the first period and the second period comprise a time period when the image frame is captured.

16. The image sensor of claim 8, wherein the second period is divided into first and second distinct second time periods and each phase difference pixel is selected a first time in the first distinct second time period and a second time in the second distinct second time period.

17. The image sensor of claim 1, wherein the plurality of normal pixels and the plurality of phase difference pixels comprise pixels captured in an image frame and the first period and the second period comprise a time period when the image frame is captured.

18. The image sensor of claim 1, wherein the second period is divided into first and second distinct second time periods and the plurality of phase difference pixels are selected a first time in the first distinct second time period and a second time in the second distinct second time period.

19. The image sensor of claim 18, wherein the second period is less than a time period for capturing an image frame.

* * * * *